United States Patent
Liu

(10) Patent No.: US 9,306,704 B2
(45) Date of Patent: Apr. 5, 2016

(54) BROADCASTING METHOD AND COMMUNICATION DEVICE

(75) Inventor: Yongjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/250,069

(22) Filed: Sep. 30, 2011

(65) Prior Publication Data

US 2012/0076143 A1    Mar. 29, 2012

Related U.S. Application Data

(63) Continuation of application No. PCT/CN2009/071145, filed on Apr. 2, 2009.

(51) Int. Cl.
*H04L 12/28* (2006.01)
*H04L 1/08* (2006.01)
*H04L 12/733* (2013.01)
(Continued)

(52) U.S. Cl.
CPC .............. *H04L 1/08* (2013.01); *H04L 12/1868* (2013.01); *H04L 45/122* (2013.01); *H04L 45/20* (2013.01); *H04L 12/18* (2013.01); *H04L 45/12* (2013.01); *H04L 45/123* (2013.01); *H04L 45/126* (2013.01); *H04L 45/127* (2013.01); *H04L 45/44* (2013.01); *H04L 45/46* (2013.01); *H04L 47/17* (2013.01);
(Continued)

(58) Field of Classification Search
CPC ....... H04L 12/18; H04L 45/12; H04L 45/122; H04L 45/123; H04L 45/126; H04L 45/127; H04L 45/20; H04L 45/44; H04L 45/46; H04L 47/17; H04L 2001/0097; H04L 1/08; H04W 40/02; H04W 40/023
USPC ................................................... 370/390, 394
See application file for complete search history.

(56) References Cited

U.S. PATENT DOCUMENTS 5,345,558 A    9/1994 Opher et al.
2002/0150099 A1    10/2002 Pung et al.
(Continued)

FOREIGN PATENT DOCUMENTS

CN    1627718 A    6/2005
CN    1756235 A    4/2006
(Continued)

OTHER PUBLICATIONS

Written Opinion of the International Searching Authority mailed Jan. 7, 2010 in corresponding International Patent Application No. PCT/CN2009/071145.
(Continued)

*Primary Examiner* — Peter Cheng
(74) *Attorney, Agent, or Firm* — Staas & Halsey LLP

(57) ABSTRACT

A broadcasting method and a communication device are disclosed by the present invention. The method includes: receiving a first data packet; and if the currently received first data packet is a repeated data packet, discarding the currently received first data packet when the times that the currently received first data packet is capable of being forwarded is less than or equal to the times that is determined according to a pre-stored hop parameter of the first data packet. After receiving the repeated data packet, a device further determines, according to a judgement result, whether to discard the data packet or continue forwarding the data packet, thereby improving the reliability of sending the data packet in the broadcasting manner.

12 Claims, 14 Drawing Sheets

(51) Int. Cl.
  *H04W 40/02* (2009.01)
  *H04L 12/721* (2013.01)
  *H04L 12/715* (2013.01)
  *H04L 12/18* (2006.01)
  *H04L 12/801* (2013.01)
  *H04L 1/00* (2006.01)

(52) U.S. Cl.
  CPC ........ *H04L 2001/0097* (2013.01); *H04W 40/02* (2013.01); *H04W 40/023* (2013.01)

(56) References Cited

U.S. PATENT DOCUMENTS

| | | | |
|---|---|---|---|
| 2005/0180399 A1* | 8/2005 | Park et al. | 370/352 |
| 2006/0013154 A1* | 1/2006 | Choi et al. | 370/312 |
| 2008/0002640 A1* | 1/2008 | Westphal | 370/338 |
| 2008/0137580 A1 | 6/2008 | Axelsson et al. | |

FOREIGN PATENT DOCUMENTS

| | | |
|---|---|---|
| CN | 1926820 | 3/2007 |
| CN | 1996804 A | 7/2007 |
| CN | 101212495 A | 7/2008 |
| KR | 10-2008-0060588 | 7/2008 |
| WO | 2009/102841 | 8/2009 |

OTHER PUBLICATIONS

Myung Lee et al., "ZigBee Broadcast Draft Specification", ZigBee Alliance, Aug. 2004, pp. 1-7, slides 1-15.

Extended European Search Report dated Apr. 27, 2012 issued in corresponding European Patent Application No. 09842494.8.

International Search Report, mailed Jan. 7, 2010, in International Application No. PCT/CN2009/071145.

Chinese Office Action issued on Aug. 1, 2012 in corresponding Chinese Patent Application No. 200980158250.5.

* cited by examiner

BROADCASTING METHOD AND COMMUNICATION DEVICE

This application is a continuation of International Application No. PCT/CN2009/071145, filed on Apr. 2, 2009, which is hereby incorporated by reference in its entirety.

FIELD OF THE INVENTION

The present invention relates to communications technologies, and in particular, to a broadcasting method and a communication device.

BACKGROUND OF THE INVENTION

Broadcast is an important way for sending network data, in which a source device sends a data packet to multiple target devices. Broadcast is a one-to-multiple sending manner. In certain situations, a source device sends a data packet to a part of adjacent devices, for example, broadcasts the data packet to all router devices, while adjacent non-router devices may discard the received broadcast data packet. In some other situations, a source device sends a data packet to all adjacent devices, that is to say, target devices to which the source device sends the data packet. The target devices are some devices in a network in certain situations, and are all the devices in the network in some other situations. Generally, a source device sends a data packet to all adjacent target devices in the broadcasting manner. All the adjacent target devices receiving the data packet forward the data packet to their own adjacent target devices, until all the target devices have received the data packet.

ZigBee is a low-speed short-distance wireless communications technology, and a reliable broadcasting method is proposed in the ZigBee standard. The implementation of the broadcasting method in the ZigBee standard is as follows. A broadcast table is stored in each device in a communication network, where the broadcast table includes a plurality of record entries that are used to record an identifier of an initiated or a received broadcast data packet. The identifier uniquely identifies a data packet. After receiving the data packet, the device searches whether a record entry identical with the identifier of the received data packet exists in the broadcast table, and if such a record entry exists in the broadcast table, it is judged that the received data packet is a repeatedly received packet, and the data packet is discarded; if such a record entry does not exist in the broadcast table, it is judged that the received data packet is a newly received packet, and the newly received packet is forwarded. Multiple methods for identifying a data packet exist, for example, a source address and a time stamp may be used to identify a data packet, or only a time stamp is used to identify a data packet, or a source address and a sequence number may be used to identify a data packet.

If each target device in the network forwards the received data packet, the same data packet may be forwarded repeatedly, thereby causing great consumption of network bandwidth and affecting normal network communications. In the broadcasting method of the ZigBee standard, the range of forwarding the data packet is restricted, so as to reduce the consumption of network bandwidth caused by repeated transmission of the data packet.

The inventor of the present application finds that, although the above broadcasting method with hop restriction added reduces the consumption of network bandwidth, problems exist in the reliability of the broadcasting method. As a result, certain devices in the network may fail to receive the data packet initiated and sent by the source device.

SUMMARY OF THE INVENTION

Embodiments of the present invention provide a broadcasting method and a device in a broadcast network with respect to the problems existing in the prior art, so as to improve the reliability of the broadcast.

An embodiment of the present invention provides a broadcasting method, where the method includes:

receiving a first data packet or first broadcast command; and if the currently received first data packet is a repeated data packet, comparing the times that the currently received first data packet or first broadcast command is capable of being forwarded with the times that is determined according to a pre-stored hop parameter of the first data packet, and if the times that the currently received first data packet or first broadcast command is capable of being forwarded is less than or equal to the times that is determined according to the pre-stored hop parameter of the first data packet, discarding the currently received first data packet or first broadcast command.

An embodiment of the present invention further provides a communication device, where the communication device includes:

a receiving module, configured to receive a first data packet or a first broadcast command;

a first judging module, configured to judge whether the currently received first data packet is a repeated data packet;

a first comparing module, configured to compare the times that the currently received first data packet or first broadcast command is capable of being forwarded with the times that is determined according to a pre-stored hop parameter of the first data packet if the first judging module determines that the data packet received currently is the repeated data packet; and a first data processing module, configured to discard the currently received first data packet or first broadcast command when the times that the currently received first data packet or first broadcast command is capable of being forwarded is less than or equal to the times that t is determined according to the pre-stored hop parameter of the first data packet.

An embodiment of the present invention further provides a communication device, where the communication device includes:

a receiving module, configured to receive a first data packet or a first broadcast command;

a first judging module, configured to judge whether the currently received first data packet is a repeated data packet;

a second comparing module, configured to compare the times that the currently received first data packet or first broadcast command is capable of being forwarded with the times that the first data packet is capable of being forwarded, where the times that the first data packet is capable of being forwarded is determined according to a pre-stored hop parameter and/or non-multicast member remaining hop parameter of the first data packet if the judging module determines that the data packet received currently is the repeated data packet; and a second data processing module, configured to discard the currently received first data packet if the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop parameter of the first data packet.

In embodiments of the present invention, after receiving the repeated data packet, the device further compares the times that the first data packet is capable of being forwarded with the times that the first data packet is capable of being forwarded where the times that the first data packet is capable of being forwarded is determined according to the pre-stored hop parameter or non-multicast member remaining hop parameter, and further determines whether to discard the data packet or continue forwarding the data packet according to a judgment result, thereby improving the reliability of sending a data packet in the broadcasting manner.

DETAILED DESCRIPTION OF THE EMBODIMENTS

The technical solutions in the embodiments of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention. The following broadcasting method according to the embodiments of the present invention can be used in various network communications, including wireless networks and wired networks.

Figure 1:
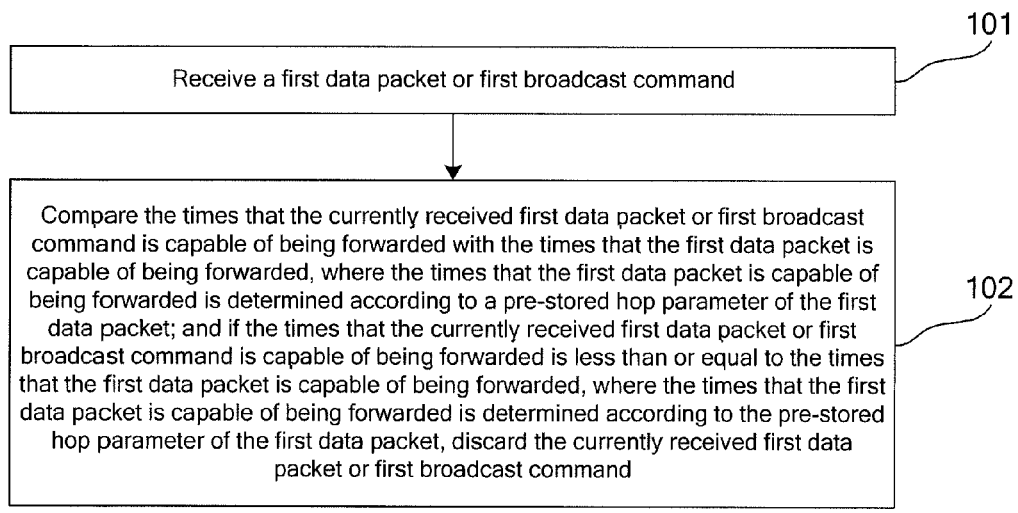
FIG. 1 is a flow chart of Embodiment 1 of a broadcasting method according to the present invention.

FIG. 1 is a flow chart of Embodiment 1 of a broadcasting method according to the present invention, where the broadcasting method includes:

Step 101: receiving a first data packet or a first broadcast command; and

Step 102: if the currently received first data packet is a repeated data packet, comparing the times that the currently received first data packet or first broadcast command is capable of being forwarded with the times that the first data packet is capable of being forwarded, where the times that the first data packet is capable of being forwarded is determined according to a pre-stored hop parameter of the first data packet, and if the times that the currently received first data packet or first broadcast command is capable of being forwarded is less than or equal to the times that the first data packet is capable of being forwarded, where the times that the first data packet is capable of being forwarded is determined according to the pre-stored hop parameter of the first data packet, discarding the currently received first data packet or first broadcast command.

In the broadcasting method of the ZigBee standard, the range of forwarding the data packet is restricted, so as to reduce the consumption of network bandwidth caused by repeated transmission of the data packet. The data packet includes a Radius domain indicating the hop number that a data packet is capable of being transferred. Each time the data packet is forwarded by one hop, 1 is subtracted from a value in the Radius domain in the data packet. When the value in the Radius domain in the data packet received by a target device is 0 after 1 is subtracted from the value, the target device does not forward the data packet. Alternatively, each time the data packet is forwarded by one hop, 1 is added to the value in the Radius domain in the data packet. When the value in the Radius domain in the data packet received by the target device exceeds a preset maximum allowable hop number after 1 is added to the value, the target device does not forward the data packet.

After each target device in the network receives the data packet, the target device may add 1 to or subtract 1 from the hop number in the data packet. If a repeated data packet is received, it is required to judge in accordance with specific conditions whether the times that a data packet currently received is capable of being forwarded is greater than the times that the data packet is capable of being forwarded, where the times that the data packet is capable of being forwarded is determined according to a pre-stored hop parameter of the data packet.

Introductions are provided below mainly by taking a case that 1 is subtracted from the hop number as an example.

Figure 2:
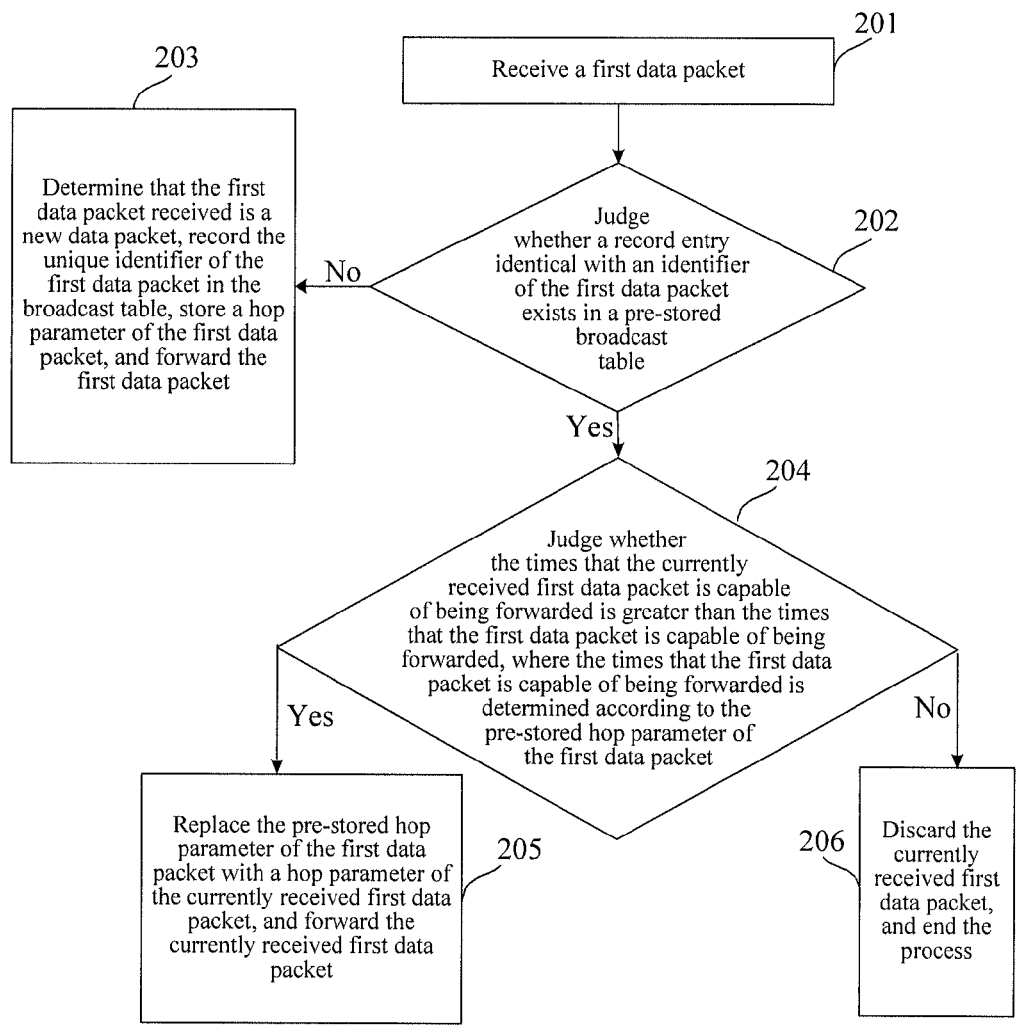
FIG. 2 is a flow chart of Embodiment 2 of a broadcasting method according to the present invention.

FIG. 2 is a flow chart of Embodiment 2 of the broadcasting method according to the present invention, where the broadcasting method includes:

Step 201: receiving a first data packet;

Step 202: judging whether a record entry identical with an identifier of the first data packet exists in a pre-stored broadcast table, and if no record entry identical with the identifier of the first data packet exists in the pre-stored broadcast table, performing step 203; otherwise, performing step 204;

Step 203: determining that the first data packet received is a new data packet, recording the identifier of the first data packet in the broadcast table, storing a hop parameter of the first data packet, forwarding the first data packet, and ending the process;

Step 204: determining that the first data packet is a repeated data packet, judging whether the times that the currently received first data packet is capable of being forwarded is greater than the times that the first data packet is capable of being forwarded, where the times that the first data packet is capable of being forwarded is determined according to the pre-stored hop parameter of the first data packet; if the times that the currently received first data packet is capable of being forwarded is greater than the times that the first data packet is capable of being forwarded, where the times that the first data packet is capable of being forwarded is determined according to the pre-stored hop parameter of the first data packet, performing step 205; and if the times that the currently received first data packet is capable of being forwarded is less than or equal to the times that the first data packet is capable of being forwarded, where the times that the first data packet is capable of being forwarded is determined according to the pre-stored hop parameter of the first data packet, performing step 206;

Step 205: replacing the pre-stored hop parameter of the first data packet with a hop parameter of the currently received first data packet, and forwarding the currently received first data packet; and Step 206: discarding the currently received first data packet, and ending the process.

The judging whether the currently received first data packet is the repeated data packet in step 202 specifically includes: judging whether a record entry identical with an identifier of the currently received first data packet exists in the pre-stored broadcast table, in which the identifier is an identifier that is capable of identifying a data packet uniquely, and the identifier may be formed of a source address and a sequence number of the data packet, or the identifier is a time stamp of the data packet, or the identifier may be formed of the source address and the time stamp.

For the case that 1 is subtracted from the hop number, in Embodiment 2, the step of judging whether the times that the currently received first data packet is capable of being forwarded is greater than the times that the first data packet is capable of being forwarded, where the times that the first data packet is capable of being forwarded is determined according to the pre-stored hop parameter is specifically as shown in step 204, that is, it can be judged whether the hop parameter of the currently received first data packet is greater than the pre-stored hop parameter of the first data packet. If the hop parameter of the currently received first data packet is greater than the pre-stored hop parameter of the first data packet, it can be determined that the times that the currently received first data packet is capable of being forwarded is greater than the times that the first data packet is capable of being forwarded, where the times that the first data packet is capable of being forwarded is determined according to the pre-stored hop parameter.

In step 203, the step of storing the hop parameter may be performed before or after the hop number in the first data packet is processed. If in step 203, the step of storing the hop parameter is performed before the hop number in the first data packet is processed, the hop parameter is the hop number in the first data packet. In step 204, the step of comparing the hop parameter in the first data packet with the pre-stored hop parameter of the first data packet may be performed before the hop number in the first data packet is processed. If in step 203, the step of storing the hop parameter is performed after the hop number in the first data packet is processed, the hop parameter is the processed hop number, that is, the hop number after 1 is subtracted from the hop number. In step 204, the step of comparing the hop parameter in the first data packet with the pre-stored hop parameter of the first data packet may be performed after the hop number in the first data packet is processed.

For example, on the assumption that the processing the hop number in the data packet is specifically: subtracting 1 from the hop number in the data packet, in step 203, when the first data packet is a new data packet, 1 is subtracted from the hop number in the first data packet, the value that is obtained after 1 is subtracted from the hop number is stored as a hop parameter, and then the first data packet is forwarded; in step 204, when the first data packet is the repeated data packet, 1 is subtracted from the hop number in the first data packet, and if the hop number after 1 is subtracted from the hop number is greater than the pre-stored hop parameter of the first data packet, the pre-stored hop parameter of the first data packet is replaced with a hop parameter of the currently received first data packet (that is, the value that is obtained after 1 is subtracted from the hop number of the currently received first data packet), and then the first data packet is forwarded, and if the hop number of the currently received first data packet after 1 is subtracted from hop number in the currently received first data packet is less than or equal to the pre-stored hop parameter of the first data packet, the currently received first data packet is discarded.

Alternatively, on the assumption that the processing the hop number in the data packet is specifically: subtracting 1 from the hop number in the data packet, in step 203, when the first data packet is a new data packet, the hop number in the currently received first data packet is stored as a hop parameter, 1 is subtracted from the hop number in the first data packet, and then the first data packet is forwarded; in step 204, when the first data packet is the repeated data packet, the pre-stored hop number of the first data packet is replaced with the hop parameter of the currently received first data packet (that is, the hop number of the currently received first data packet) if the hop parameter of the currently received first data packet is greater than the pre-stored hop parameter of the first data packet, and then the first data packet is forwarded after 1 is subtracted from the hop number in the first data packet; and if the hop number of the currently received first data packet is less than or equal to the pre-stored hop parameter of the first data packet, the currently received first data packet is discarded.

In Embodiment 2, a broadcast table is stored in each device in the network, in which the broadcast table includes multiple record entries, each of which is used to to record an identifier of a data packet, and a hop parameter of the data packet may be stored in a record entry that is corresponding to the data packet and is in the broadcast table. Alternatively, because each target device needs to buffer and then forward the data packet after receiving the data packet, the hop parameter of the data packet may be stored as a part of the buffered data packet. After receiving the data packet, the target device can buffer the data packet, and the data packet may be extracted by searching the identifier relevant to the data packet in the broadcast table.

The implementation of Embodiment 2 in the present invention is described below with devices in a specific network.

Figure 3:
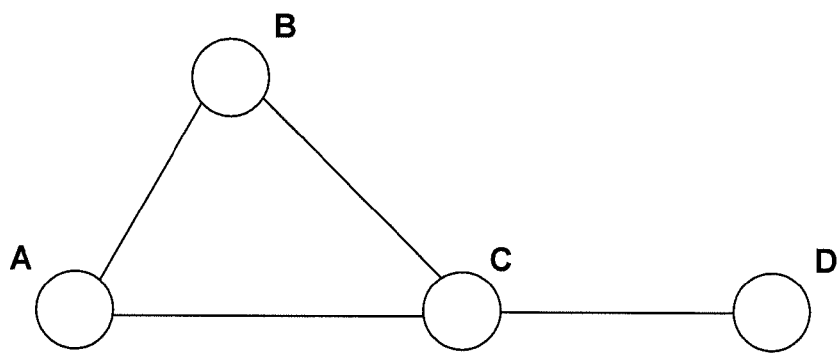
FIG. 3 illustrates a network structure according to an embodiment of the present invention.

FIG. 3 illustrates a network structure according to an embodiment of the present invention. The implementation of the embodiment of the present invention is introduced below by taking the network structure illustrated in FIG. 3 as an example.

In FIG. 3, A device serving as a source device sends a 2-hop data packet M, B device receives the data packet M at the beginning, while C device fails to receive the data packet M due to interference, the C device subsequently receives the data packet M forwarded by the B device, and the C device searches a broadcast table stored by the C device itself to judge whether a record entry identical with an identifier of the data packet M exists. Because the C device receives the data packet M for the first time, no data packet identical with the identifier of the data packet M exists in the broadcast table of the C device, and the C device judges that the data packet M is a new data packet.

The C device subtracts 1 from the hop number in the data packet M, and the C device adds a record entry of the data packet M to its own broadcast table, records the identifier of the data packet M, and records a hop parameter of the data packet M (because the C device subtracts 1 from the hop number in the data packet M, the hop parameter herein is 0). After the C device subtracts 1 from the hop number in the data packet M, the hop number of the data packet M becomes 0, and then the C device will not forward the data packet M.

Because the A device fails to receive the data packet M forwarded by the C device, the A device re-initiates and sends a 2-hop data packet M; at this time, the C device receives the 2-hop data packet M sent by the A device, and after receiving the data packet M sent by the A device, the C device searches its own broadcast table and judges whether a record entry identical with the identifier of the data packet M exists. The B device has forwarded the data packet M to the C device before, the source address in the data packet M forwarded by the B device is the A device, for the B device forwards the data packet instead of actively initiating and sending the data packet. The source address in the data packet M subsequently sent by the A device to the C device is also the A device. In this way, the C device is capable of finding the record entry identical with the identifier of the data packet M received currently in its own broadcast table, that is, the record entry added by the C device after the C device has received the data packet M forwarded by the B device. Consequently, the C device judges that the data packet M received currently is a repeated data packet.

After receiving the repeated data packet, the C device needs to make a further judgment instead of directly discarding the data packet. Specifically, the C device compares the value after 1 is subtracted from the hop number in the data packet M received currently from the A device (that is, the hop parameter of the current data packet M) with the hop parameter recorded in the record entry relevant to the data packet M in the broadcast table. The value after 1 is subtracted from the hop number in the data packet M received currently is 2−1=1 hop, while the hop parameter of the data packet M stored in the broadcast table is 0, 1>0, that is, the times (1) that the data packet M received currently by the C device is capable of being forwarded is greater than the times (0) that the data packet M is capable of being forwarded, where the times (0) that the data packet M is capable of being forwarded is determined according to the pre-stored hop parameter of the data packet M, and therefore the C device replaces the hop parameter of the data packet M in the broadcast table with 1 hop. Then, the C device subtracts 1 from the hop number in the data packet M and forwards the data packet. The hop number in the data packet M received by the C device is 2 and becomes 1 after 1 is subtracted from the hop number, and therefore the C device may forward the data packet.

If according to the broadcasting method in the ZigBee standard in the prior art, the C device directly discards the data packet after receiving the repeated data packet, while data packet M forwarded by the B device cannot be forwarded due to insufficient remaining hops, it may result in that the C device cannot receive the data packet M sent from the A device. In the method provided in Embodiment 2 of the present invention, after receiving the repeated data packet, the C device further compares the times that the data packet M received currently and sent from the A device is capable of being forwarded with the times that the data packet M is capable of being forwarded, where the times that the data packet M is capable of being forwarded is determined according to the hop parameter recorded in the record entry relevant to the data packet M in the broadcast table, so as to avoid a problem that the C device directly discards a data packet sent from a device with fewer hops apart from the C device, thereby improving the reliability of sending a data packet in the broadcasting manner.

Figure 4:
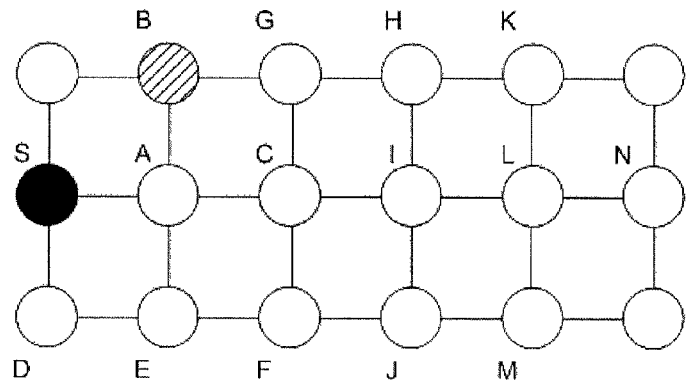
FIG. 4 illustrates another network structure according to an embodiment of the present invention.

FIG. 4 illustrates another network structure according to an embodiment of the present invention. The implementation of the embodiment of the present invention is introduced below by taking the network structure illustrated in FIG. 4 as an example.

In FIG. 4, S device serving as a source device initiates broadcast and sends a 5-hop data packet M to adjacent A device and D device, and B device is a routing device with low power consumption. A low consumption route is an important feature in a wireless sensor network. A low consumption routing device usually sleeps and works periodically, other devices cannot communicate with the low consumption device when it sleeps, and the other devices can communicate with the low consumption routing device only when it does not sleep. If the B device happens to be in a sleep state, the A device needs to wait for wakeup of the B device and then forwards the received data packet M. Therefore, the D device forwards the data packet first. The D device forwards the data packet M to E device, the E device forwards the data packet M to F device, the F device forwards the data packet M to C device and J device. The C device first receives the 2-hop data packet M forwarded by the F device, adds a record entry relevant to the data packet M to its own broadcast table, records the identifier of the data packet M, records the hop parameter (that is, 2−1=1 hop) of the data packet M in the record entry, and then forwards the data packet M to G, I, A, and F devices after subtracting 1 from the hop number in the data packet M, and after the G device and the I device subtract 1 from the hop number in the data packet M, the hop number is 0, and then the data packet is not forwarded any more. After a period of time, the B device is waken up, and the A device forwards the received data packet M. The C device receives the data packet M forwarded by the A device, and the C device searches its own broadcast table and judges whether a record entry identical with the identifier of the data packet M exists. The F device has forwarded the data packet M to the C device before, and therefore the C device is capable of finding the record entry identical with the identifier of the data packet M received currently in the broadcast table. Consequently, the C device judges that the data packet M received currently is a repeated data packet.

The C device compares the value after 1 is subtracted from the hop number in the data packet M received currently that is forwarded by the A device (that is, the hop parameter of the current data packet M) with the hop parameter recorded in the record entry relevant to the data packet M in the broadcast table. The value after 1 is subtracted from the hop number in the data packet M that is received currently and that is forwarded by the A device is 4−1=3 hops, while the hop parameter of the data packet M stored in the broadcast table is 1 hop, 3>1, that is, the times that the data packet M received currently is capable of being forwarded is greater than the times that the data packet M is capable of being forwarded, where the times that the data packet M is capable of being forwarded is determined according to the pre-stored hop parameter of the data packet M, and therefore the C device replaces the hop parameter of the data packet M in the broadcast table with 3 hops. Then, the C device subtracts 1 from the hop number in the data packet M received currently that is forwarded by the A device and forwards the data packet to the G, I, A, and F devices. The hop number in the data packet M received by the G and I devices that is forwarded by the C device is 3 hops. In this way, the G and I devices can forward the received data packet M, and H, K, L, and N devices can also receive the data packet M accordingly.

Figure 5:
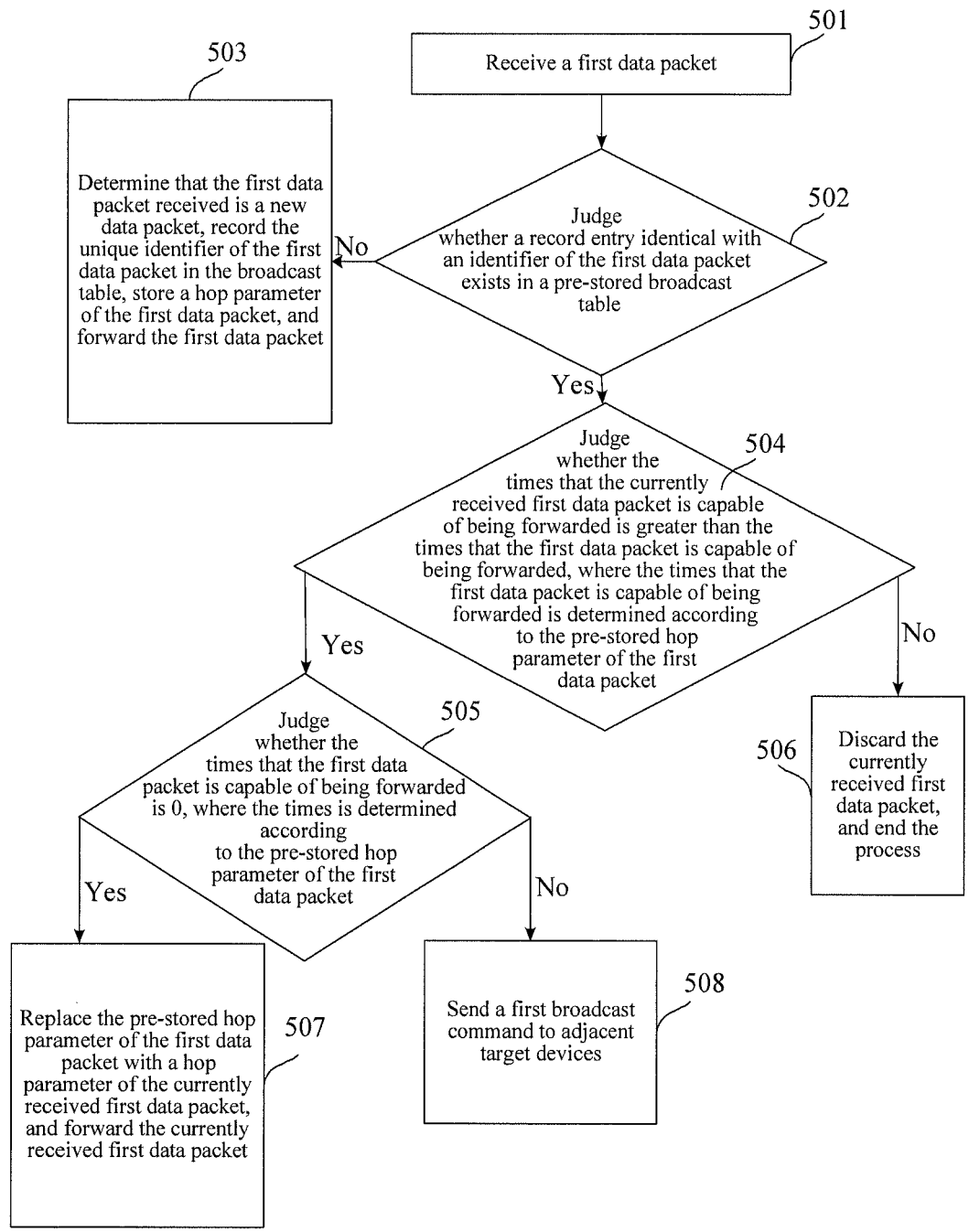
FIG. 5 is a flow chart of Embodiment 3 of a broadcasting method according to the present invention.

FIG. 5 is a flow chart of Embodiment 3 of a broadcasting method according to the present invention, where the broadcasting method includes:

Step 501: receiving a first data packet;

Step 502: judging whether a record entry identical with an identifier of the first data packet exists in a pre-stored broadcast table, and if no record entry identical with the identifier of the first data packet exists in the pre-stored broadcast table, performing step 503; otherwise, performing step 504;

Step 503: determining that the first data packet received is a new data packet, recording the identifier of the first data packet in the broadcast table, storing a hop parameter of the first data packet, forwarding the first data packet, and ending the process;

Step 504: determining that the first data packet is a repeated data packet, judging whether the times that the currently received first data packet is capable of being forwarded is greater than the times that the first data packet is capable of being forwarded, where the times that the first data packet is capable of being forwarded is determined according to the pre-stored hop parameter of the first data packet, and if the times that the currently received first data packet is capable of being forwarded is greater than the times that the first data packet is capable of being forwarded, where the times that the first data packet is capable of being forwarded is determined according to the pre-stored hop parameter of the first data packet, performing step 505; otherwise, performing step 506;

Step 505: judging whether the times that the first data packet is capable of being forwarded is 0, where the times that the first data packet is capable of being forwarded is determined according to the pre-stored hop parameter of the first data packet, and if the times is 0, it indicates that the previously received first data packet has not been forwarded, performing step 507; and if the times is not 0, it indicates that the previously received first data packet has been forwarded, performing step 508;

Step 506: discarding the currently received first data packet, and ending the process;

Step 507: replacing the pre-stored hop parameter of the first data packet with a hop parameter of the currently received first data packet, forwarding the currently received first data packet, and ending the process; and Step 508: sending a first broadcast command to adjacent target devices, in which the first broadcast command includes a source address and a sequence number of the currently received first data packet and a value that is obtained after hop processing is performed on the hop number of the first data packet, and the value is a value after 1 is subtracted from the hop number in the currently received first data packet specific to this embodiment; the hop number in the first broadcast command is the value of the hop number in the first data packet after 1 is subtracted from the hop number. The processing manner after other target devices receive the first broadcast command is similar to that after the data packet is received; specifically, after receiving the first broadcast command, the target device searches its own broadcast table, and if a record entry identical with all identifiers in the first broadcast command exists in the broadcast table, compares a hop parameter in the first broadcast command (that is, the value after 1 is subtracted from the hop number in the first broadcast command) with a hop parameter in the record entry. If the hop parameter in the first broadcast command is greater than the hop parameter in the record entry, the hop parameter in the record entry is replaced with the hop parameter in the first broadcast command, a data packet in the record entry identical with the identifier in the first broadcast command is extracted, the hop number in the extracted data packet is set as the hop number in the first broadcast command, and then the extracted data packet is forwarded; if the hop parameter in the first broadcast command is less than or equal to the hop parameter in the record entry, the first broadcast command is discarded, or the first broadcast command is forwarded, that is, the first broadcast command is forwarded after 1 is subtracted from the hop number in the first broadcast command, and forwarding is stopped until the hop number in the first broadcast command is 0.

If no record entry identical with the identifiers in the first broadcast command exists in the broadcast table, it indicates that the target device has not received a data packet identical with the identifiers in the first broadcast command, and the target device discards the command, or forwards the command after subtracting 1 from the hop number in the command, and forwarding is stopped until the hop number in the command is 0.

By taking the network structure illustrated in FIG. 4 as an example, after the C device receives the repeated data packet M forwarded by the A device, the C device judges that the times that the data packet M is capable of being forwarded is greater than the times that the data packet M is capable of being forwarded, where the times that the data packet M is capable of being forwarded is determined according to the pre-stored hop parameter of the data packet M. Specifically, it can be judged that the value after 1 is subtracted from the hop number in the data packet M (that is, the hop parameter of the current data packet M) is greater than the hop parameter (that is, 1 hop) recorded in the record entry relevant to the data packet M in the broadcast table. Then, the C device continues judging that the times that the data packet M is capable of being forwarded is not 0 (that is, the pre-stored hop parameter of the data packet M is not 0), where the times that the data packet M is capable of being forwarded is determined according to the pre-stored hop parameter of the data packet M. Consequently, the C device sends a first broadcast command to adjacent target devices G, I, F, and A, and the first broadcast command includes a source address and a sequence number of the data packet M and the hop parameter of the data packet M received currently by the C device. Since the B device sleeps before, the D device first forwards the data packet M. A record entry relevant to the data packet M is stored in record tables of the G and I devices, and the hop parameter of the data packet M in the record entry is 0. After receiving a subsequent first broadcast command, the G and I devices can find a record entry identical with all identifiers in the first broadcast command in their own broadcast tables, the hop parameter in the first broadcast command is greater than the hop parameter of the data packet M stored in the record entry, and the pre-stored hop parameter of the data packet M is 0, and therefore the G and I devices extract the data packet M, set the hop number in the extracted data packet M as the value of the hop parameter of the first broadcast command (that is, the value after 1 is subtracted from the hop number of the first broadcast command), and forward the data packet M. The first broadcast command is sent to the G and I devices, so that the G and I devices forward the data packet M that is before received.

Therefore, the situation as in the prior art in which the G and I devices stop forwarding due to insufficient remaining hops in the data packet M, so as to result in that adjacent target devices of the G and I devices fail to receive the data packet M.

According to the method in Embodiment 3 of the present invention, for a data packet received repeatedly, when the hop parameter of the data packet is greater than the pre-stored hop parameter of the data packet and the times that the data packet is capable of being forwarded is not 0, where the times that the data packet is capable of being forwarded is determined according to the pre-stored hop parameter of the data packet, a first broadcast command is sent instead of forwarding the data packet. Since the number of bytes of the first broadcast command is less than that of the data packet, the number of bytes transmitted can be saved.

In the method of Embodiment 3, after receiving a first broadcast command, some target devices fail to find an record entry identical with all identifiers in the added broadcast command in a broadcast table stored by the target devices, that is to say, the target devices have not received a data packet identical with all identifiers in the first broadcast command before. In this way, even if the devices receive the first broadcast command, the devices cannot forward the corresponding data packet.

By taking the network structure illustrated in FIG. 4 as an example, the C device first receives a 2-hop data packet M forwarded by the F device, adds a record entry relevant to the data packet M to its own broadcast table, records an identifier of the data packet M, records a hop parameter (that is, 2−1=1 hop) of the data packet M in the record entry, and then forwards the data packet M to the I, F, and A devices after 1 is subtracted from the hop number of the data packet M. However, due to interference, the G and I devices fail to receive the data packet forwarded by the C and J devices after the data packet is retransmitted for many times. After a period of time, the B device is waken up, and the A device forwards the received data packet M. The C device receives the data packet M forwarded by the A device, and the C device searches its own broadcast table and judges whether a record entry identical with the identifier of the data packet M exists. The F device has forwarded the data packet to the C device before, and therefore the C device can find the record entry identical with the identifier of the data packet M that is currently received. Consequently, the C device judges that the data packet M received currently is a repeated data packet.

The C device compares the value after 1 is subtracted from the hop number in the data packet M that is received currently and that is forwarded by the A device (that is, the hop parameter of the current data packet M) with the hop parameter recorded in the record entry relevant to the data packet M in the broadcast table. The value after 1 is subtracted from the hop number in the data packet M that is received currently and that is forwarded by the A device is 4−1=3 hops, while the hop parameter of the data packet M stored in the broadcast table is 1 hop, 3>1. That is, the times that the data packet M received currently is capable of being forwarded is greater than the times that the data packet M is capable of being forwarded, where the times that the data packet M is capable of being forwarded is determined according to the pre-stored hop parameter of the data packet M; and the times that the data packet M is capable of being forwarded is not 0, where the times that the data packet M is capable of being forwarded is determined according to the pre-stored hop parameter of the data packet M; and therefore the C device sends a first broadcast command. The identifier of the command is identical with that of the stored data packet, of which the hop number is 3 hops, and then the C device forwards the first broadcast command to the G, I, F, and A devices. The hop number in the first broadcast command that is received by the G and I devices and and is sent by the C device is 3 hops, which becomes 2 hops after 1 is subtracted from the hop number. Since the G and I devices have not received the broadcast packet before due to interference, the G and I devices will discard the received first broadcast command if finding no corresponding entry after searching the broadcast table, which may still result in that the H, K, L, and N devices fail to receive the data packet M finally.

To avoid occurrence of such a situation, the present invention provides Embodiment 4.

Figure 6A:
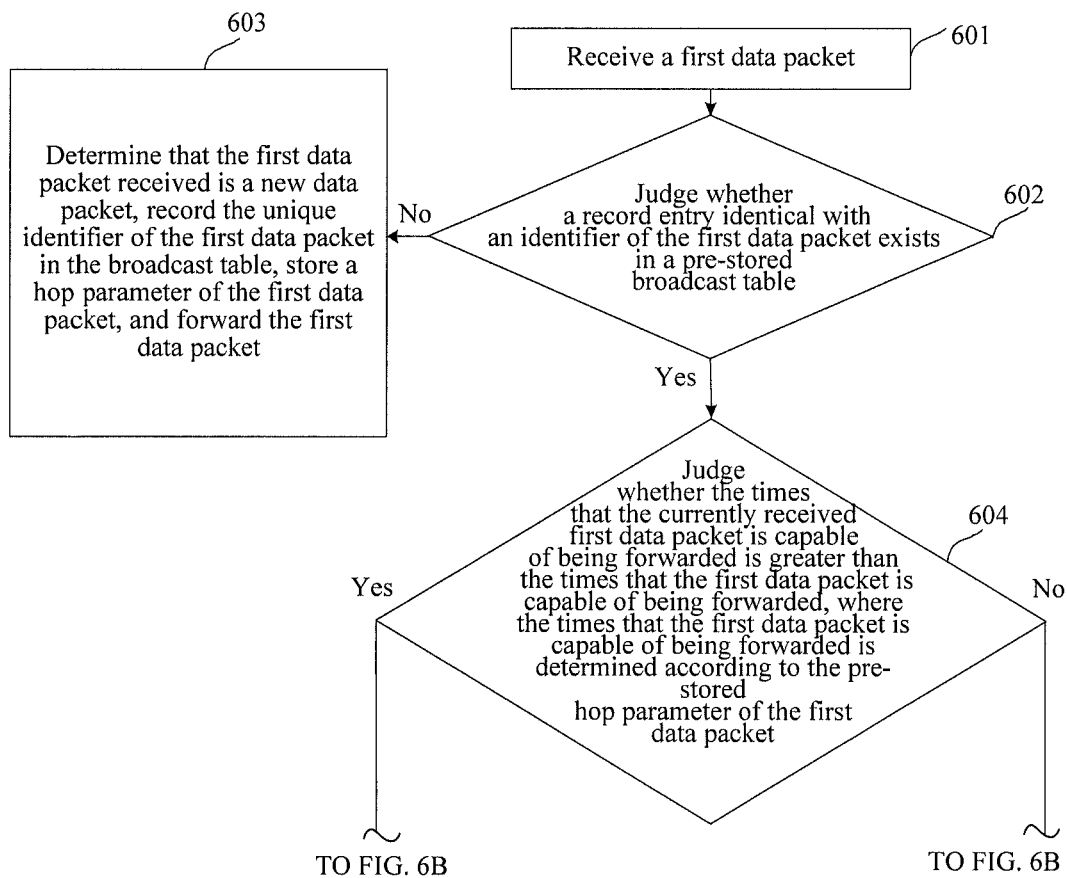
FIGS. 6A and 6B are a flow chart of Embodiment 4 of a broadcasting method according to the present invention.
Figure 6B:
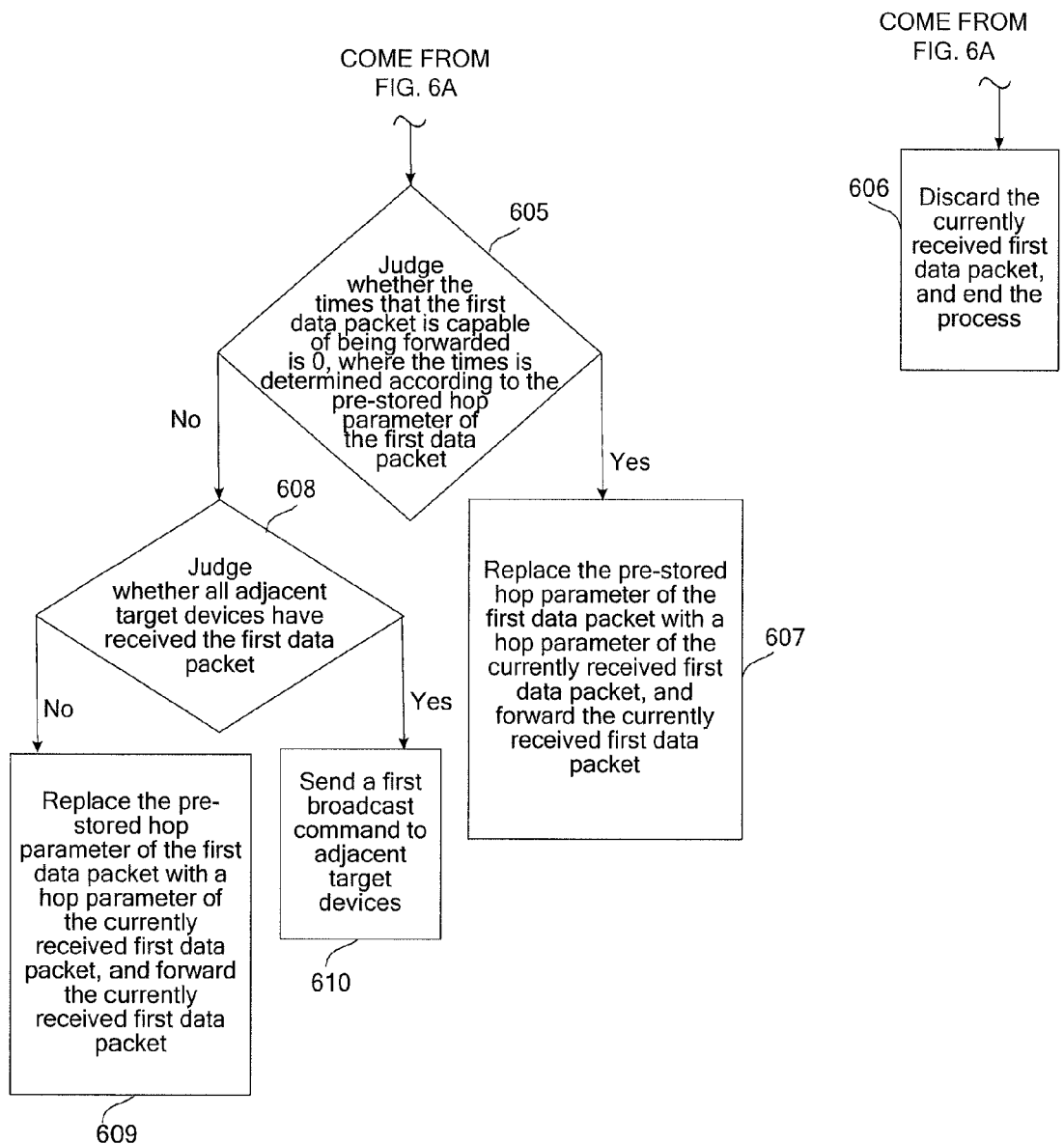

FIG. 6 is a flow chart of Embodiment 4 of a broadcasting method according to the present invention, where the broadcasting method includes:

Step 601: receiving a first data packet;

Step 602: judging whether a record entry identical with an identifier of the first data packet exists in a pre-stored broadcast table, and if no record entry identical with the identifier of the first data packet exists in a pre-stored broadcast table, performing step 603; otherwise, performing step 604;

Step 603: determining that the received first data packet is a new data packet, recording the identifier of the first data packet in the broadcast table, storing a hop parameter of the first data packet, forwarding the first data packet, and ending the process. Specifically, a forwarding state of the first data packet is added to the record entry that is relevant to the first data packet and is stored at the device itself, for example, the A device has n adjacent target devices, and when a first data packet forwarded by an adjacent target device M is received, the fact that the first data packet has been received by the M device is marked in the record entry relevant to the first data packet in the A device, until the fact that the first data packet has been received by all the n adjacent target devices is marked in the record entry of the first data packet. If within a predetermined time, the forwarding state of the first data packet in the A device is not that all the n adjacent target devices have received the first data packet, the A device needs to re-forward the first data packet to the n adjacent target devices. MAC layer source addresses carried in the first data packet forwarded by the n adjacent target devices of the A device are different, so that the A device can learn which adjacent target device forwards the first data packet. Source addresses of the first data packet forwarded by the n adjacent target devices are identical, and the source addresses herein refer to network layer source addresses. In the process that the first data packet is forwarded in the network, the source addresses in the data packet are unchanged, but the data packet may carry MAC layer source addresses of different devices after the data packet is forwarded by the different devices.

Step 604: determining that the first data packet is a repeated data packet, comparing the times that the currently received first data packet is capable of being forwarded with the times that the first data packet is capable of being forwarded, where the times that the first data packet is capable of being forwarded is determined according to the pre-stored hop parameter of the first data packet, and if the times that the currently received first data packet is capable of being forwarded is greater than the times that the first data packet is capable of being forwarded, where the times that the first data packet is capable of being forwarded is determined according to the pre-stored hop parameter of the first data packet, performing step 605; otherwise, performing step 606;

Step 605: judging whether the times that the first data packet is capable of being forwarded is 0, where the times that the first data packet is capable of being forwarded is determined according to the pre-stored hop parameter of the first data packet, and if the times is 0, performing step 607; otherwise, performing step 608;

Step 606: discarding the currently received first data packet, and ending the process;

Step 607: replacing the pre-stored hop parameter of the first data packet with a hop parameter of the currently received first data packet, forwarding the currently received first data packet, and ending the process;

Step 608: judging whether all adjacent target devices have received the first data packet, and if all the adjacent target devices have received the first data packet, performing step 609; if all the adjacent target devices have not received the first data packet, it indicates that some devices in the adjacent target devices may not receive the first data packet, and performing step 610. Specifically, the device may judge whether the forwarding state of the first data packet is marked as that all the adjacent target devices have received the first data packet in the record entry that is relevant to the first data packet and is stored by the device itself.

Step 609: sending a first broadcast command to the adjacent target devices, in which the first broadcast command includes a source address and a sequence number of the currently received first data packet and remaining hops of the first data packet after passing through a current device, and the hop number in the first broadcast command is the remaining hops of the first data packet after passing through the current device, and ending the process; and Step 610: replacing the hop parameter of the first data packet stored in the broadcast table with a hop parameter of the currently received first data packet, forwarding the currently received first data packet after 1 is subtracted from the hop number of the first data packet, and ending the process.

In Embodiment 4, the first broadcast command is sent to the adjacent target devices when it is judged that the fact that the first data packet has been received by all the adjacent target devices is marked in the record entry that is relevant to the first data packet and is stored by the target devices. In this way, the situation in which some adjacent target devices fail to receive the first data packet but receive the first broadcast command is avoided. Further, by sending the first broadcast command instead of the first data packet, transmission of amount of data in the network can be reduced.

The format of the first broadcast command can be as shown in Table 1.

TABLE 1 the format of the first broadcast command involved in the embodiments of the present invention

| Number of bytes | 2 | 1 | 1 |
|---|---|---|---|
| Frame header | Source address | Sequence number | The value that is obtained after hop processing is performed on the hop number of the first data packet |

In the Table 1, the source address occupies two bytes, the sequence number occupies one byte, and the value of the hop number in the currently received first data packet after hop processing occupies one byte, or a value that is obtained after hop processing is performed on the hop number of the first data packet can be placed in the field where the frame header is located. The Table 1 only gives one example of the first broadcast command, and the first broadcast command may be other command formats capable of being transmitted in the network in the broadcasting manner.

If a data packet is identified uniquely through a time stamp, it is required to carry in the first broadcast command a time stamp of the currently received first data packet and a value that is obtained after hop processing is performed on the hop number of the first data packet.

If a data packet is identified uniquely through a time stamp and a source address, it is required to carry in the first broadcast command a time stamp and a source address of the currently received first data packet and a value that is obtained after hop processing is performed on the hop number of the first data packet.

In the prior art, if a data packet sent by a certain device in the network to adjacent target devices is not received by all the adjacent target devices, the device may resend the data packet, that is, retransmit the data packet. In each embodiment of the present invention, except that the data packet sent to the adjacent target devices is retransmitted because the data packet sent to the adjacent target devices is not received by all the adjacent target devices, for the data packet received repeatedly, after it is determined that the data packet received repeatedly is forwarded, the data packet received repeatedly may also be forwarded, that is, the data packet is retransmitted, when the times that the data packet is capable of being forwarded is greater than the times that the data packet is capable of being forwarded, where the times that the data packet is capable of being forwarded is determined according to the pre-stored hop parameter. The data packet received repeatedly can only be forwarded once when being re-forwarded, for example, in steps 207, 507, and 607, the first data packet can be forwarded once (forwarding once means forwarding the first data packet to all the adjacent target devices), and the data packet is not retransmitted even if some adjacent target devices fail to receive the data packet. Alternatively, for the data packet received repeatedly, when the hop parameter in the data packet is greater than the pre-stored hop parameter, a counter that counts times of retransmitting the first data packet by the device is cleared, and then the data packet received repeatedly is forwarded. Alternatively, for the data packet received repeatedly, when the hop parameter in the data packet is greater than the pre-stored hop parameter, the first data packet received repeatedly is forwarded until the retransmission times reaches a maximum value.

In the foregoing embodiments, the step of storing the hop parameter is performed after hop processing is performed on the hop number of the first data packet, that is, the pre-stored hop parameter is the value after 1 is subtracted from the hop number of the currently received first data packet. If the step of storing the hop parameter is performed before the hop processing is performed on the first data packet, the stored hop parameter is the value of the hop number of the currently received first data packet. In steps 505 and 605, the judging whether the times that the first data packet is capable of being forwarded is 0 may specifically mean judging whether the pre-stored hop parameter of the first data packet is 1 hop, where the times that the first data packet is capable of being forwarded is determined according to the pre-stored hop parameter of the first data packet.

If the step of storing the hop parameter is performed before the hop processing is performed on the first data packet and 1 is added to the hop number of the data packet, the stored hop parameter is the value of the hop number of the currently received first data packet. In steps 505 and 605, the judging whether the times that the first data packet is capable of being forwarded is 0 may specifically mean judging whether the pre-stored hop parameter of the first data packet is the value after 1 is subtracted from a maximum allowable hop, where the times that the first data packet is capable of being forwarded is determined according to the pre-stored hop parameter of the first data packet.

If the step of storing the hop parameter is performed after the hop processing is performed on the first data packet and 1 is added to the hop number of the data packet, the stored hop parameter is the value after 1 is added to the hop number of the currently received first data packet. In steps 505 and 605, the judging whether the times that the first data packet is capable of being forwarded is 0 may specifically mean judging whether the pre-stored hop parameter of the first data packet is the maximum allowable hop, where the times that the first data packet is capable of being forwarded is determined according to the pre-stored hop parameter of the first data packet.

Figure 7:
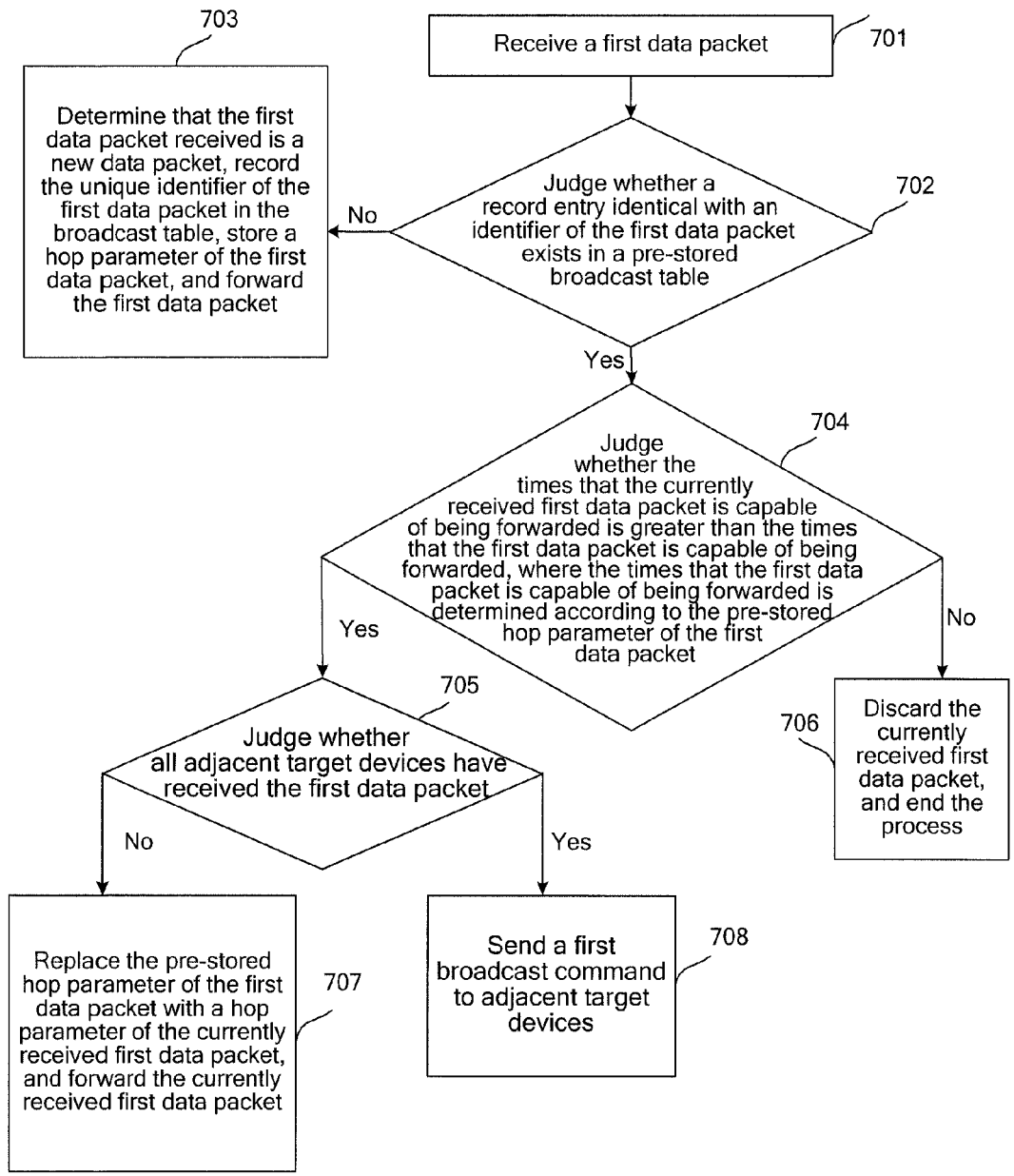
FIG. 7 is a flow chart of Embodiment 5 of a broadcasting method according to the present invention.

FIG. 7 is a flow chart of Embodiment 5 of a broadcasting method according to the present invention. Steps 701-703 of Embodiment 5 are identical with steps 601-603 of Embodiment 4 respectively. Steps of Embodiment 5 which are different from those of Embodiment 4 are described below:

Step 704: determining that the first data packet is a repeated data packet, judging whether the times that the currently received first data packet is capable of being forwarded is greater than the times that the first data packet is capable of being forwarded, where the times that the first data packet is capable of being forwarded is determined according to the pre-stored hop parameter of the first data packet, and if the times that the currently received first data packet is capable of being forwarded is greater than the times that the first data packet is capable of being forwarded, where the times that the first data packet is capable of being forwarded is determined according to the pre-stored hop parameter of the first data packet, performing step 705; otherwise, performing step 706;

Step 705: judging whether all adjacent target devices have received the first data packet, and if all the adjacent target devices have received the first data packet, performing step 708; and if all the adjacent target devices have not received the first data packet, it indicates that some devices in the adjacent target devices may not receive the first data packet, and performing step 707. Specifically, the device can judge whether the forwarding state of the first data packet is marked as that all the adjacent target devices have received the first data packet in the record entry that is relevant to the first data packet and is stored by the device itself.

Step 706: discarding the currently received first data packet, and ending the process;

Step 707: replacing the hop parameter of the first data packet stored in the broadcast table with a hop parameter of the currently received first data packet, forwarding the currently received first data packet after 1 is subtracted from the hop number of the first data packet, and ending the process; and Step 708: sending a first broadcast command to the adjacent target devices, in which the first broadcast command includes a source address and a sequence number of the currently received first data packet and the hop number of the first data packet after passing through a current device (that is, the hop number after 1 is added to or subtracted from the hop number of currently received first data packet), and the hop number in the first broadcast command is the hop number of the first data packet after passing through the current device, and ending the process.

In Embodiment 5, when the times that the currently received first data packet is capable of being forwarded is greater than the times that the first data packet is capable of being forwarded, where the times that the first data packet is capable of being forwarded is determined according to the pre-stored hop parameter of the first data packet, whether all the adjacent target devices have received the first data packet is judged, instead of a fact as needed in Embodiment 4 that whether all the adjacent target devices have received the first data packet is judged only after it is determined that the times that the first data packet is capable of being forwarded is not 0, where the times that the first data packet is capable of being forwarded is determined according to the pre-stored hop parameter of the first data packet. Even if a device itself has not sent a first data packet to adjacent devices, the adjacent devices may receive the first data packet from other devices; and if a device receives the first data packet forwarded by all the adjacent devices, it can be determined that all the adjacent devices have received the first data packet, and the device itself does not need to re-forward the first data packet but only needs to send a first broadcast command.

Devices in the network may belong to some predetermined groups, some of the devices may be multicast members, and some devices may be non-multicast members. Respective devices in the network can record identifiers of groups to which the devices belong. For such a network, when a multicast member serving as a source device initiates broadcast of a data packet, the multicast data packet of broadcast carries two pieces of specific information for multicast in addition to the hop number and identifier of the data packet, in which one is called a maximum multicast member hop interval, and the other is called a non-multicast remaining hop. Besides, the data packet sent by the source device further carries identifiers of the groups, and therefore the receiving device can judge whether the device itself is a multicast group member device.

Figure 8:
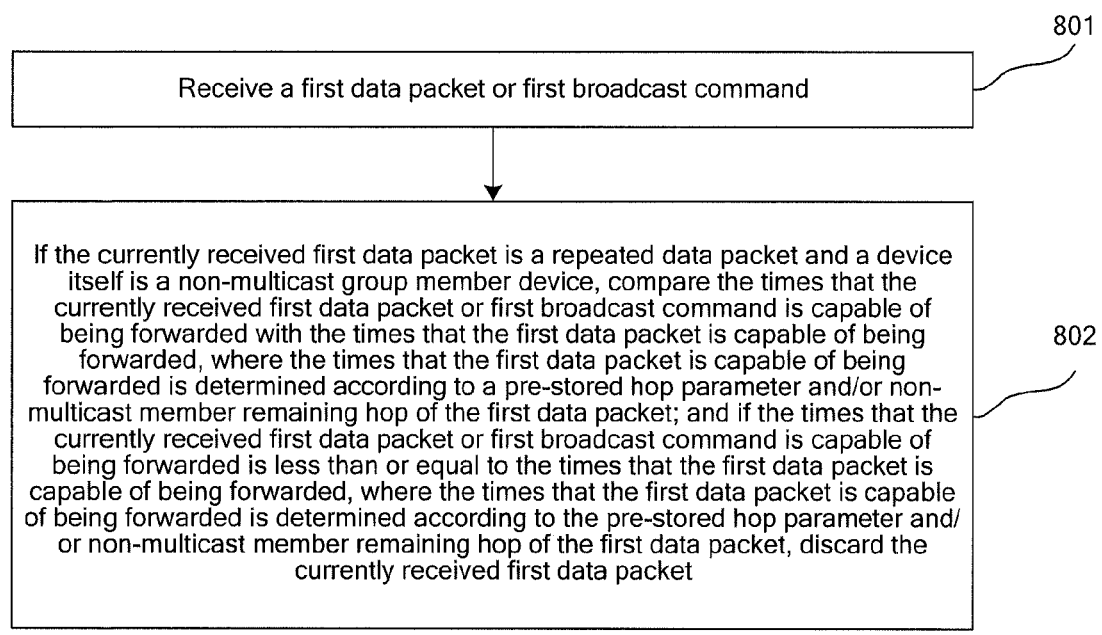
FIG. 8 is a flow chart of Embodiment 6 of a broadcasting method according to the present invention.

FIG. 8 is a flow chart of Embodiment 6 of a broadcasting method according to the present invention. The method illustrated in Embodiment 6 is applicable to non-multicast group member devices in a network, and the method includes:

Step 801: receiving a first data packet or a first broadcast command; and

Step 802: if the currently received first data packet is a repeated data packet and a device itself is a non-multicast group member device, comparing the times that the currently received first data packet or first broadcast command is capable of being forwarded with the times that the first data packet is capable of being forwarded, where the first data packet is capable of being forwarded is determined according to a pre-stored hop parameter and/or non-multicast member remaining hop of the first data packet, and if the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop of the first data packet, discarding the currently received first data packet.

When a device in the network receives a data packet, the processing on the non-multicast remaining hop is similar to that on the hop number in the data packet, which is also performed by adding 1 to or subtracting 1 from the non-multicast member remaining hop. Therefore, similar to the hop parameter, the non-multicast member remaining hop parameter may be the non-multicast member remaining hop in the data packet or the value after 1 is added to or subtracted from the non-multicast member remaining hop in the data packet. The maximum multicast member hop interval in the data packet is not processed.

Introductions are provided below by taking a case that 1 is subtracted from the hop number and the non-multicast member remaining hop in the data packet as an example.

Figure 9:
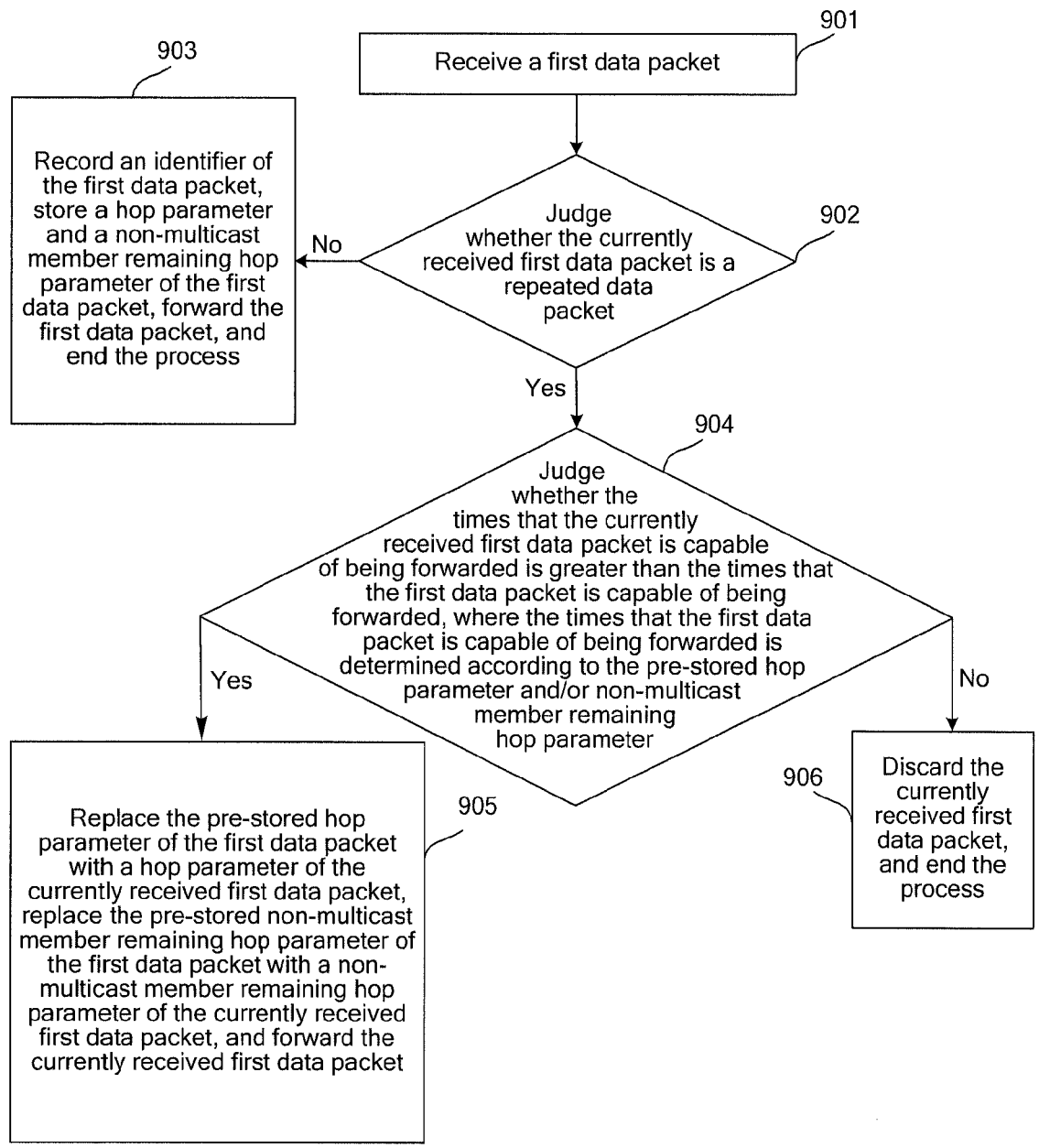
FIG. 9 is a flow chart of Embodiment 7 of a broadcasting method according to the present invention.

FIG. 9 is a flow chart of Embodiment 7 of a broadcasting method according to the present invention, where the broadcasting method includes:

Step 901: receiving a first data packet;

Step 902: judging whether the currently received first data packet is a repeated data packet, and if the currently received first data packet is not the repeated data packet, performing step 903; otherwise, performing step 904;

Step 903: recording an identifier of the first data packet, storing a hop parameter and a non-multicast member remaining hop parameter of the first data packet, forwarding the first data packet, and ending the process;

Step 904: judging whether the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, if the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, performing step 905; and if the times that the currently received first data packet is capable of being forwarded is less than or equal to the times that the first data packet is capable of being forwarded, where the times that the first data packet is capable of being forwarded is determined according to the pre-stored hop parameter and/or non-multicast member remaining hop parameter, performing step 906;

Step 905: replacing the pre-stored hop parameter of the first data packet with a hop parameter of the currently received first data packet, replacing the pre-stored non-multicast member remaining hop parameter of the first data packet with a non-multicast member remaining hop parameter of the currently received first data packet, and forwarding the currently received first data packet; and Step 906: discarding the currently received first data packet, and ending the process.

In step 904, the judging whether the times that the currently received first data packet is capable of being forwarded is greater than the times that the first data packet is capable of being forwarded may be performed only according to the hop parameter or non-multicast member remaining hop parameter, or according to both the hop parameter and the non-multicast member remaining hop parameter, where the times that the first data packet is capable of being forwarded is determined according to the pre-stored hop parameter and/or non-multicast member remaining hop parameter.

For example, it is determined, according to a hop parameter in the currently received first data packet or first broadcast command, that the times that the first data packet is capable of being forwarded is A1, it is determined, according to a non-multicast member remaining parameter in the first data packet or first broadcast command, that the times that the first data packet is capable of being forwarded is B1, it is determined, according to the pre-stored hop parameter of the first data packet, that the times that the first data packet is capable of being forwarded is A2, and it is determined, according to the pre-stored non-multicast member remaining hop, that the times that the first data packet is capable of being forwarded is B2.

It is determined that the times that the currently received first data packet or first broadcast command is capable of being forwarded is greater than the times that the first data packet is capable of being forwarded, where the times that the first data packet is capable of being forwarded is determined according to the pre-stored hop parameter and/or non-multicast member remaining hop of the first data packet, if A1 is greater than A2 and B1 is greater than B2; otherwise, it is determined that the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop of the first data packet.

Alternatively, it is determined that the times that the currently received first data packet or first broadcast command is capable of being forwarded is greater than the times that the first data packet is capable of being forwarded, where the times that the first data packet is capable of being forwarded is determined according to the pre-stored hop parameter and/or non-multicast member remaining hop of the first data packet, if A1 is greater than A2 or B1 is greater than B2; otherwise, it is determined that the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop of the first data packet.

Figure 10:
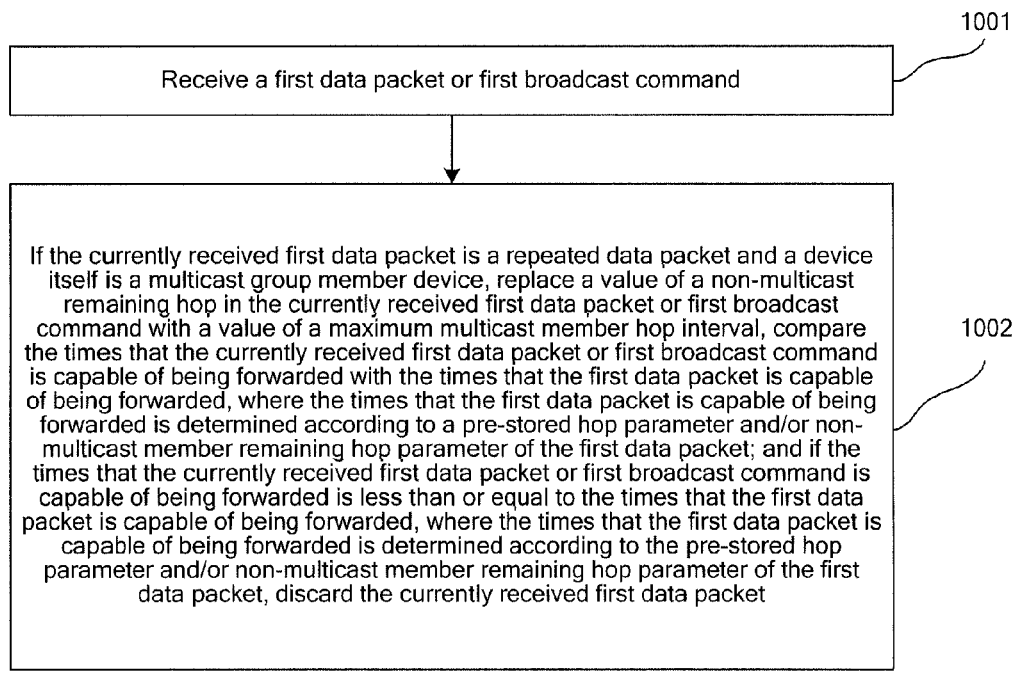
FIG. 10 is a flow chart of Embodiment 8 of a broadcasting method according to the present invention.

FIG. 10 is a flow chart of Embodiment 8 of a broadcasting method according to the present invention, and the embodiment is applicable to multicast group member devices in a network, where the broadcasting method includes:

Step 1001: receiving a first data packet or a first broadcast command; and

Step 1002: if the currently received first data packet is a repeated data packet and a device itself is a multicast group member device, replacing a value of a non-multicast remaining hop in the currently received first data packet or first broadcast command with a value of a maximum multicast member hop interval, comparing the times that the currently received first data packet or first broadcast command is capable of being forwarded with the times that the first data packet is capable of being forwarded, where the times that the first data packet is capable of being forwarded is determined according to a pre-stored hop parameter and/or non-multicast member remaining hop parameter of the first data packet, and if the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop parameter of the first data packet, discarding the currently received first data packet.

Figure 11:
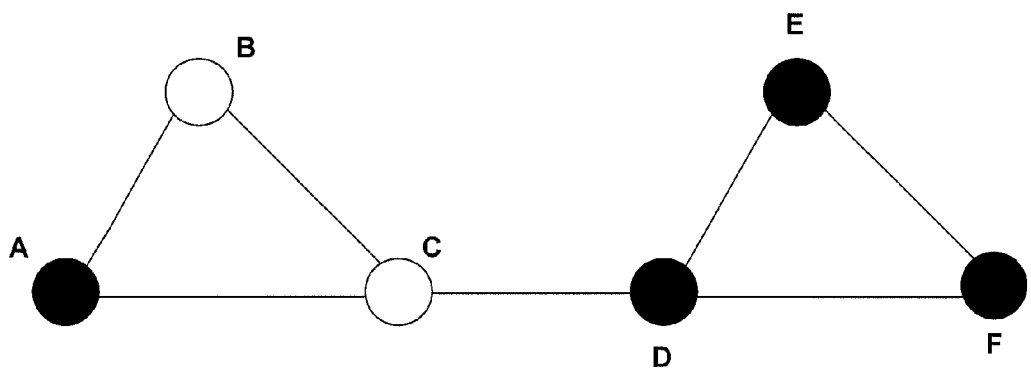
FIG. 11 illustrates another network structure according to an embodiment of the present invention.

FIG. 11 illustrates yet another network structure according to an embodiment of the present invention, and the implementation of Embodiment 7 is introduced below by taking the network structure illustrated in FIG. 11 as an example.

In FIGS. 11, A, D, E, and F devices belong to the same multicast group, and B and C devices are non-multicast members. The A device in the multicast group initiates a multicast process, and first sends a data packet M in the broadcasting manner, in which the hop number is set as 3, and the maximum multicast member hop interval and the non-multicast member remaining hop are set as 2. The B device subtracts 1 from the hop number to make the hop number become 2 after receiving the multicast data packet. Since the B device is not a multicast member, the non-multicast member remaining hop in the data packet M becomes 1 after 1 is subtracted from the non-multicast member remaining hop, and then the data packet M is forwarded. On the assumption that the C device fails to receive the data packet M from the A device due to interference, but receives the data packet M forwarded by the B device, the C device subtracts 1 from the hop number to make the hop number become 1, and the non-multicast member remaining hop in the data packet M becomes 0 after 1 is subtracted from the non-multicast member remaining hop. At this time, C judges whether to continue forwarding the multicast data packet. Because the non-multicast member remaining hop becomes 0, the C device does not perform forwarding any longer and discards the data packet M that is currently received. However, the C device may record a record entry of the received data packet M in a broadcast table, and records the hop parameter (that is, the value after 1 is subtracted from the hop number of the data packet M) and the non-multicast member remaining hop parameter (that is, the value after 1 is subtracted from the non-multicast member remaining hop) of the data packet M. At this time, the A device rebroadcasts, and the C device receives the data packet M broadcast by the A device, subtracts 1 from the hop number of the data packet M to make the hop number become 2, and subtracts 1 from the non-multicast member remaining hop to make the hop become 1. According to the prior art, C considers that the received data packet is a repeated data packet and may directly discard the data packet M, but in the embodiment of the present invention, the C device needs to compare the times that the data packet M received currently is capable of being forwarded with the times that the data packet M is capable of being forwarded, where the times that the data packet M is capable of being forwarded is determined according to a pre-stored hop parameter and/or non-multicast member remaining hop parameter of the data packet M. After comparison, the C device finds that the hop parameter and the non-multicast member remaining hop parameter of the repeated data packet M received are respectively greater than the pre-stored hop parameter and the non-multicast member remaining hop parameter of the data packet M. Therefore, the C device updates the stored hop parameter and the non-multicast member remaining hop parameter of the data packet M respectively as 2 and 1, that is, replaces the stored hop parameter and the non-multicast member remaining hop parameter of the data packet M with values of the hop parameter and the non-multicast member remaining hop parameter of the data packet M that is currently received, and forwards the data packet M. At this time, the hop number in the multicast data packet which is broadcast by the C device and received by the D device is 2, and the non-multicast member remaining hop is 1. Because the D device is a multicast group member device, the D device may update the non-multicast member remaining hop in the data packet M as the value of the maximum multicast member hop interval in the data packet M that is currently received, that is, 2, the non-multicast member remaining hop becomes 1 after 1 is subtracted from the non-multicast member remaining hop, and the hop number becomes 1 after 1 is subtracted from the hop number. After judgment, the D device can determine that the times that the data packet M received currently is capable of being forwarded is greater than the times that the data packet M is capable of being forwarded, where the times that the data packet M is capable of being forwarded is determined according to the pre-stored hop parameter and/or non-multicast member remaining hop parameter of the data packet M, and therefore the D device continues forwarding the data packet M to the E device and the F device. After receiving the data packet M, the E device and the F device may also update the non-multicast member remaining hop in the data packet M as the value of the maximum multicast member hop interval in the data packet M that is currently received, that is, 2, subtract 1 from the non-multicast member remaining hop of the data packet M, and then perform forwarding. Finally, all the multicast group member devices can receive the data packet M.

Figure 12:
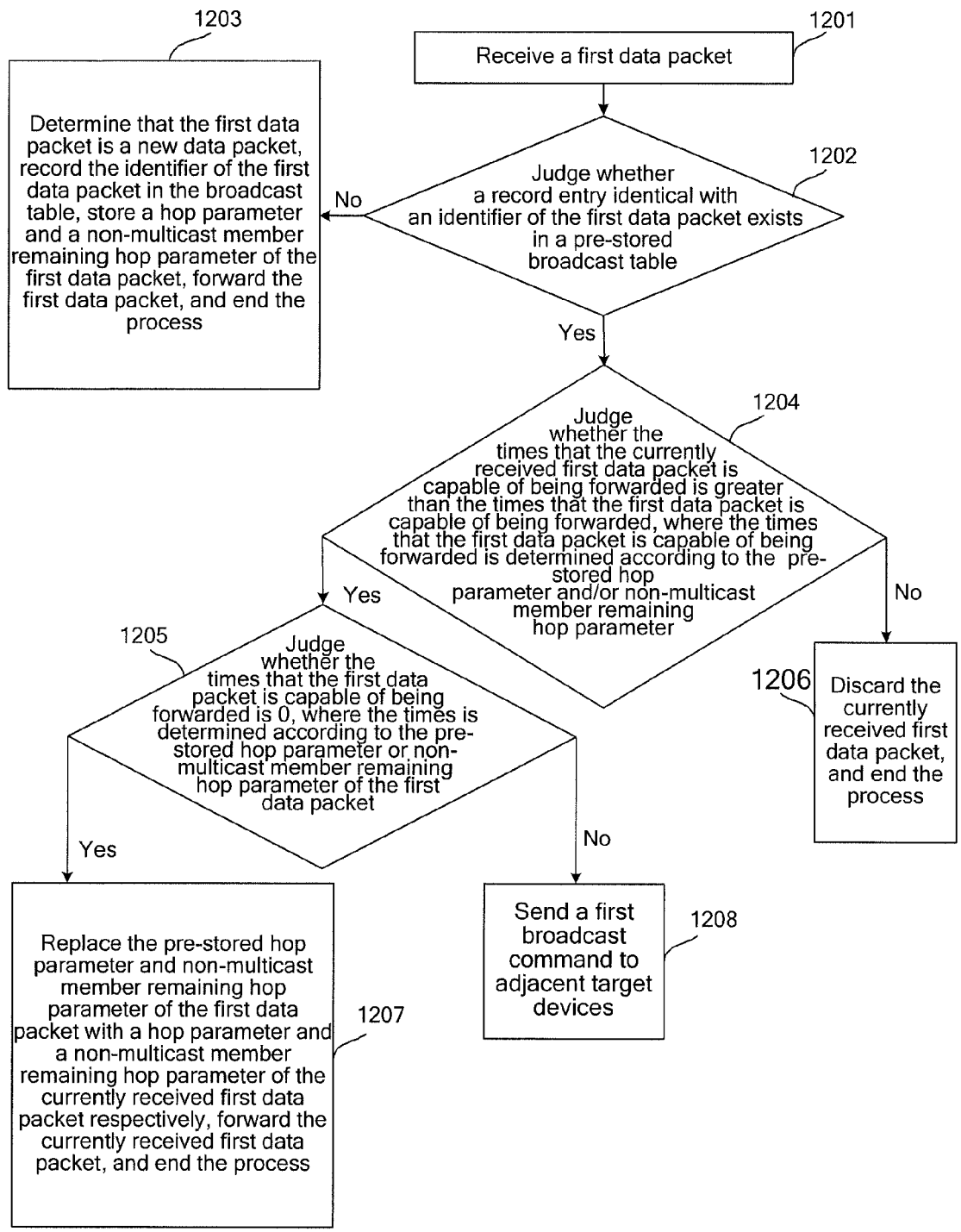
FIG. 12 is a flow chart of Embodiment 9 of a broadcasting method according to the present invention.

FIG. 12 is a flow chart of Embodiment 9 of a broadcasting method according to the present invention, where the broadcasting method includes:

Step 1201: receiving a first data packet;

Step 1202: judging whether a record entry identical with an identifier of the first data packet exists in a pre-stored broadcast table, and if no record entry identical with the identifier of the first data packet exists in the pre-stored broadcast table, performing step 1203; otherwise, performing step 1204;

Step 1203: determining that the first data packet is a new data packet, recording the identifier of the first data packet in the broadcast table, storing a hop parameter and a non-multicast member remaining hop parameter of the first data packet, forwarding the first data packet, and ending the process;

Step 1204: determining that the first data packet is a repeated data packet, judging whether the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, and if the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, performing step 1205; and if the times that the currently received first data packet is capable of being forwarded is less than or equal to the times that the first data packet is capable of being forwarded, where the times that the first data packet is capable of being forwarded is determined according to the pre-stored hop parameter and/or non-multicast member remaining hop parameter, performing step 1206;

Step 1205: judging whether the times that the first data packet is capable of being forwarded is 0, where the times that the first data packet is capable of being forwarded is determined according to the pre-stored hop parameter or non-multicast member remaining hop parameter of the first data packet, and if the times is 0, it indicates that the previously received first data packet has not been forwarded, performing step 1207; and if the times is not 0, it indicates that the previously received first data packet has been forwarded, and performing step 1208;

Step 1206: discarding the currently received first data packet, and ending the process;

Step 1207: replacing the pre-stored hop parameter and non-multicast member remaining hop parameter of the first data packet with a hop parameter and a non-multicast member remaining hop parameter of the currently received first data packet respectively, forwarding the currently received first data packet, and ending the process; and Step 1208: sending a first broadcast command to adjacent target devices, in which the first broadcast command includes a source address and a sequence number of the currently received first data packet and values that are obtained after hop processing is performed on the hop number and the non-multicast member remaining hop in the currently received first data packet. The hop number in the first broadcast command is a value that is obtained after one is subtracted from the hop number in the first data packet, and the non-multicast member remaining hop in the first broadcast command is a value that is obtained after one is subtracted from the non-multicast member remaining hop in the first data packet, and the processing manner after other target devices receive the first broadcast command is similar to that after other target devices receive the data packet.

Figure 13A:
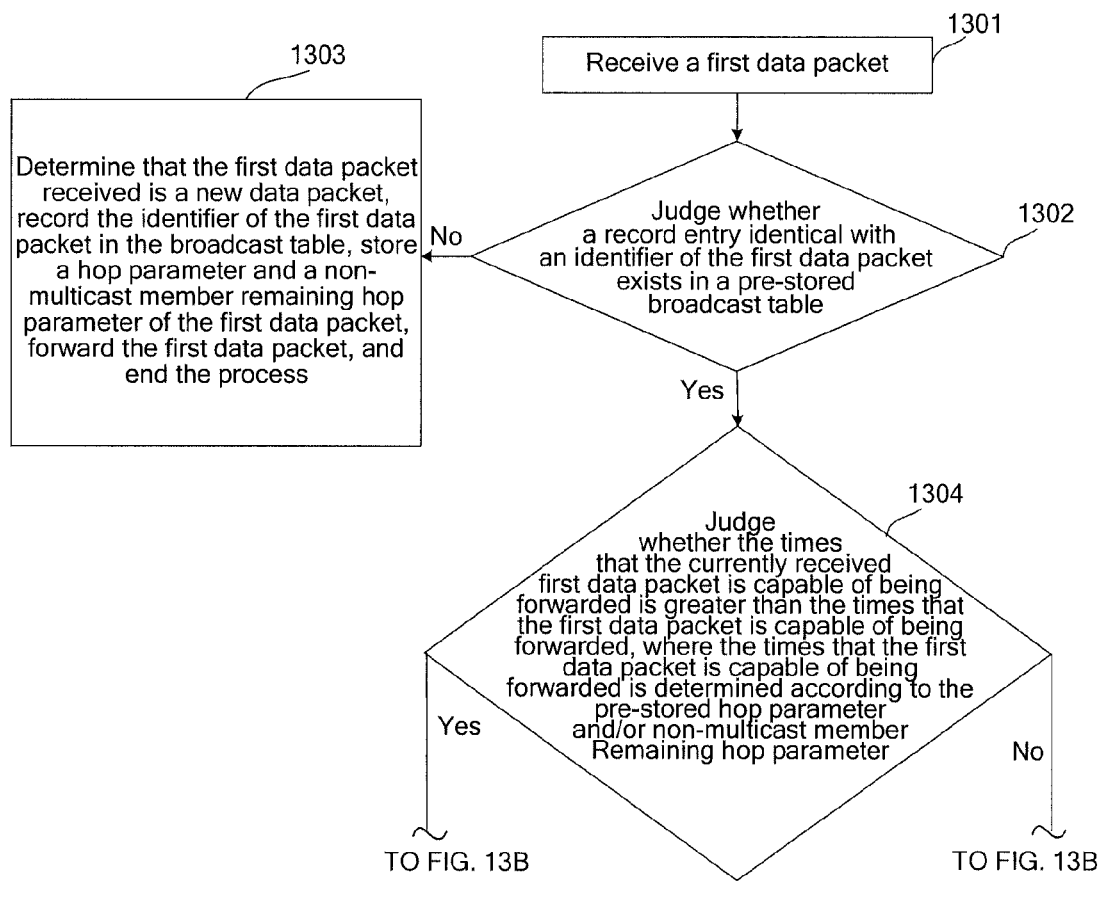
FIGS. 13A and 13B are a flow chart of Embodiment 10 of a broadcasting method according to the present invention.
Figure 13B:
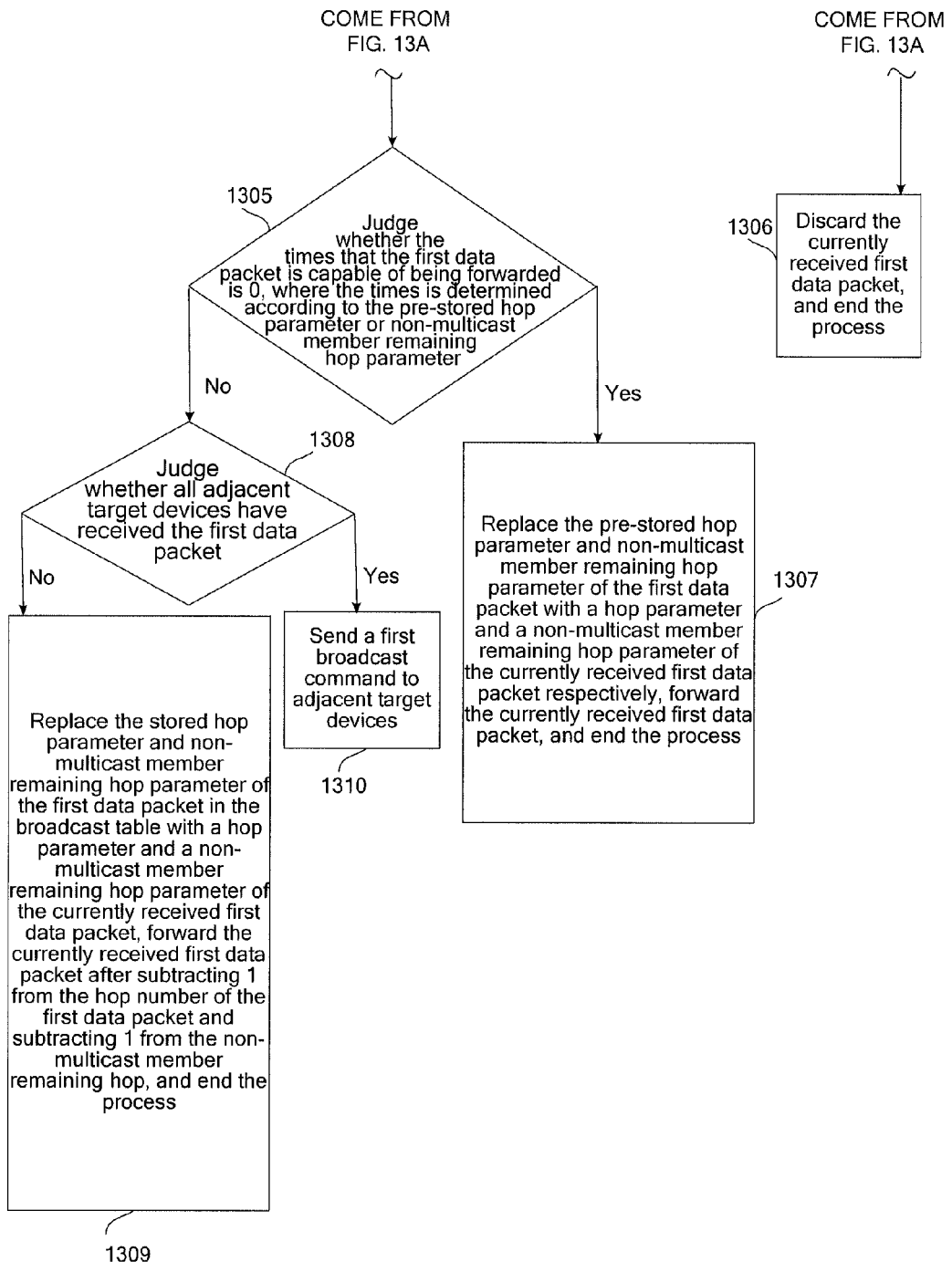

FIG. 13 is a flow chart of Embodiment 10 of a broadcasting method according to the present invention, where the broadcasting method includes:

Step 1301: receiving a first data packet;

Step 1302: judging whether a record entry identical with an identifier of the first data packet exists in a pre-stored broadcast table, and if no record entry identical with the identifier of the first data packet exists in a pre-stored broadcast table, performing step 1303; otherwise, performing step 1304;

Step 1303: determining that the first data packet received is a new data packet, recording the identifier of the first data packet in the broadcast table, storing a hop parameter and a non-multicast member remaining hop parameter of the first data packet, forwarding the first data packet, and ending the process;

Step 1304: determining that the first data packet is a repeated data packet, judging whether the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, and if the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter, performing step 1305; and if the times that the currently received first data packet is capable of being forwarded is less than or equal to the times that the first data packet is capable of being forwarded, where the times that the first data packet is capable of being forwarded is determined according to the pre-stored hop parameter and/or non-multicast member remaining hop parameter, performing step 1306;

Step 1305: judging whether the times that the first data packet is capable of being forwarded is 0, where the times that the first data packet is capable of being forwarded is determined according to the pre-stored hop parameter or non-multicast member remaining hop parameter, and if the times is 0, performing step 1307; otherwise, performing step 1308;

Step 1306: discarding the currently received first data packet, and ending the process;

Step 1307: replacing the pre-stored hop parameter and non-multicast member remaining hop parameter of the first data packet with a hop parameter and a non-multicast member remaining hop parameter of the currently received first data packet respectively, forwarding the currently received first data packet, and ending the process;

Step 1308: judging whether all adjacent target devices have received the first data packet, and if all the adjacent target devices have received the first data packet, performing step 1309; and if all the adjacent target devices have not received the first data packet, it indicates that some devices in the adjacent target devices may not receive the first data packet, performing step 1310. Specifically, the device may judge whether the forwarding state of the first data packet is marked as that all the adjacent target devices have received the first data packet in the record entry that is relevant to the first data packet and is stored by the device itself.

Step 1309: sending a first broadcast command to the adjacent target devices, in which the first broadcast command includes a source address and a sequence number of the currently received first data packet and values of a remaining hop and a non-multicast member remaining hop after hop processing when the first data packet passes through a current device, and ending the process; and Step 1310: replacing the stored hop parameter and the non-multicast member remaining hop parameter of the first data packet in the broadcast table with a hop parameter and a non-multicast member remaining hop parameter of the currently received first data packet, forwarding the currently received first data packet after subtracting 1 from the hop number of the first data packet and subtracting 1 from the non-multicast member remaining hop, and ending the process.

Figure 14:
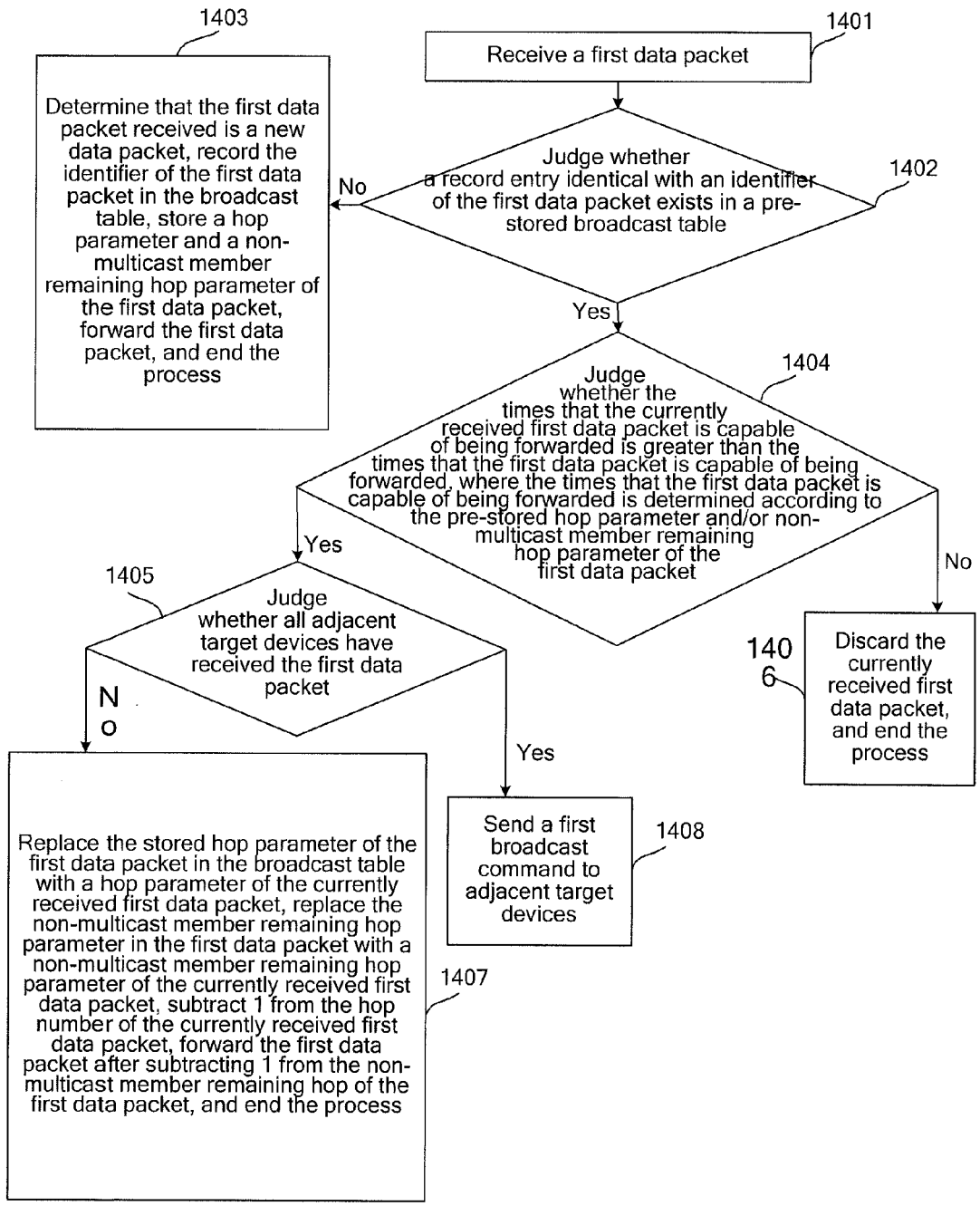
FIG. 14 is a flow chart of Embodiment 11 of a broadcasting method according to the present invention.

FIG. 14 is a flow chart of Embodiment 11 of a broadcasting method according to the present invention. Compared with Embodiment 10, steps 1401-1403 in Embodiment 11 are identical with steps 1301-1303 in Embodiment 10 respectively, and steps different from those in Embodiment 10 include:

Step 1404: determining that the first data packet received is a repeated data packet, judging whether the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter of the first data packet, and if the times that the currently received first data packet is capable of being forwarded is greater than the times that the first data packet is capable of being forwarded, where the times that the first data packet is capable of being forwarded is determined according to the pre-stored hop parameter and/or non-multicast member remaining hop parameter of the first data packet, performing step 1405; otherwise, performing step 1406;

Step 1405: judging whether all adjacent target devices have received the first data packet, and if all the adjacent target devices have received the first data packet, performing step 1406; and if all adjacent target devices have not received the first data packet, which indicates that some devices in the adjacent target devices may not receive the first data packet, performing step 1407. Specifically, the device can judge whether the forwarding state of the first data packet is marked as that all the adjacent target devices have received the first data packet in the record entry that is relevant to the first data packet and that is stored by the device itself.

Step 1406: discarding the currently received first data packet;

Step 1407: replacing the stored hop parameter of the first data packet in the broadcast table with a hop parameter of the currently received first data packet, replacing the non-multicast member remaining hop parameter in the first data packet with a non-multicast member remaining hop parameter of the currently received first data packet, subtracting 1 from the hop number of the currently received first data packet, subtracting 1 from the non-multicast member remaining hop of the first data packet, forwarding the first data packet, and ending the process; and Step 1408: sending a first broadcast command to the adjacent target devices, and ending the process.

Some devices in the network can receive and identify the source address, the sequence number, and the hop number in the first broadcast command, but cannot forward the first broadcast command. For such devices, if it is required to forward or send the first broadcast command according to the method in the foregoing embodiments, that is, the data packet whose identifier is identical with the identifier in the first broadcast command is sent or forwarded, the hop number in the data packet sent or forwarded is the hop number of the first broadcast command.

In actual applications, some devices in the network may support processing on the data packet in the method provided in the embodiments of the present invention, but some devices may not support the processing on the data packet. The devices supporting the processing on the data packet in the method provided in the embodiments of the present invention, when receiving a data packet sent from devices that do not support the processing on relevant data packet in the embodiments of the present invention, can also process the data packet according to the method provided in the preceding embodiments.

The foregoing embodiments mainly describe the processing method when a device in the network receives a data packet, and for a source device that is in the network and actively initiates and sends a data packet, an identifier and a hop parameter of the data packet may be recorded when the data packet is sent. After receiving a data packet, the source device searches a record entry that is relevant to the sent data packet and is stored in its own broadcast table, and if the source device finds a record entry identical with the identifier of the data packet sent by the source device itself, marks that an adjacent target device has received the data packet sent by the source device. If within a predetermined time, some adjacent target devices do not receive the data packet sent by the source device, the source device will re-initiate and send the data packet.

The processing method after the device receives the first broadcast command is similar to that after the device receives the data packet, which is not repeatedly described herein.

Figure 15:
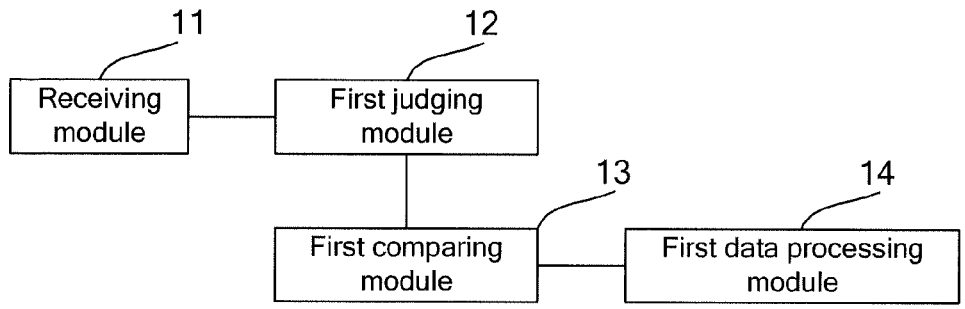
FIG. 15 is a schematic structural diagram of Embodiment 1 of a device in a broadcast network according to the present invention.

FIG. 15 is a schematic structural diagram of Embodiment 1 of a communication device according to the present invention, where the device includes a receiving module 11, a first judging module 12, a first comparing module 13, and a first data processing module 14, in which the first judging module 12 is connected to the receiving module 11 and the first comparing module 13 respectively, and the first data processing module 14 is connected to the first comparing module 13. The working principle of the device is: the receiving module 11 receives a first data packet or a first broadcast command, the first judging module 12 judges whether the first data packet currently received by the receiving module 11 is a repeated data packet, when the first judging module determines that the currently received first data packet is a repeated data packet, the first comparing module 13 compares the times that the currently received first data packet or first broadcast command is capable of being forwarded with the times that the first data packet is capable of being forwarded, where the times that the first data packet is capable of being forwarded is determined according to a pre-stored hop parameter of the first data packet, and if a comparison result of the first comparing module 13 is that the times that the currently received first data packet or first broadcast command is capable of being forwarded is less than or equal to the times that the first data packet is capable of being forwarded, where the times that the first data packet is capable of being forwarded is determined according to the pre-stored hop parameter of the first data packet, the first data processing module 14 discards the currently received first data packet or first broadcast command.

The device illustrated in FIG. 15 may further include a first storing module. The first storing module is configured to store an identifier and a hop parameter carried by the currently received first data packet when the currently received first data packet is not a repeated data packet, and configured to store an identifier and a hop parameter of a previously received first data packet.

The first judging module 12 in FIG. 15 is specifically configured to judge whether the currently received first data packet is a repeated data packet according to the identifier carried by the first data packet or first broadcast command currently received by the receiving module 11, in which the identifier is formed of a source address and a sequence number of the data packet, or the identifier is a time stamp of the data packet, or the identifier is formed of the time stamp and the source address of the data packet.

If the times that the currently received first data packet or first broadcast command is capable of being forwarded is greater than the times that the first data packet is capable of being forwarded, where the times that the first data packet is capable of being forwarded is determined according to the pre-stored hop parameter of the first data packet, the first data processing module 14 replaces a hop parameter of the first data packet pre-stored in the first storing module with a hop parameter of the currently received first data packet or first broadcast command, and forwards the currently received first data packet or sends the first broadcast command.

The first data processing module 14 may include a first data processing sub-unit and a second data processing sub-unit (not shown in FIG. 15). The first data processing sub-unit judges whether the times that the first data packet is capable of being forwarded is 0, where the times that the first data packet is capable of being forwarded is determined according to the hop parameter pre-stored by the first storing module; forwards the currently received first data packet if the times that the first data packet is capable of being forwarded is 0, where the times that the first data packet is capable of being forwarded is determined according to the hop parameter pre-stored by the first storing module; and sends the first broadcast command if the times that the first data packet is capable of being forwarded is not 0, where the times that the first data packet is capable of being forwarded is determined according to the hop parameter pre-stored by the first storing module.

The second data processing sub-unit judges whether all adjacent devices have received the first data packet or first broadcast command; sends the first broadcast command if all the adjacent devices have received the first data packet or first broadcast command; and sends the currently received first data packet if not all the adjacent devices have received the first data packet or first broadcast command.

Figure 16:
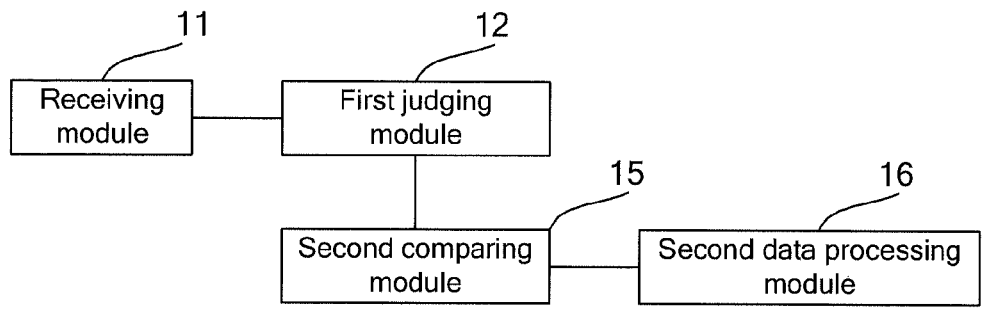
FIG. 16 is a schematic structural diagram of Embodiment 2 of a device in the broadcast network according to the present invention.

FIG. 16 is a schematic structural diagram of Embodiment 2 of a communication device according to the present invention. The device includes a receiving module 11, a first judging module 12, a second comparing module 15, and a second data processing module 16, in which the first judging module 12 is connected to the receiving module 11 and the second comparing module 15 respectively, and the second data processing module 16 is connected to the second comparing module 15. The working principle of the device is: the receiving module 11 receives a first data packet or first broadcast command, the first judging module 12 judges whether the first data packet currently received by the receiving module 11 is a repeated data packet, if the first judging module determines that the first data packet currently received by the receiving module 11 is a repeated data packet, the second comparing module 15 compares the times that the currently received first data packet or first broadcast command is capable of being forwarded with the times that the first data packet is capable of being forwarded, where the times that the first data packet is capable of being forwarded is determined according to a pre-stored hop parameter and/or non-multicast member remaining hop parameter of the first data packet, and if a comparison result of the second comparing module 15 is that the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop parameter of the first data packet, the second data processing module 16 discards the currently received first data packet.

Figure 17:
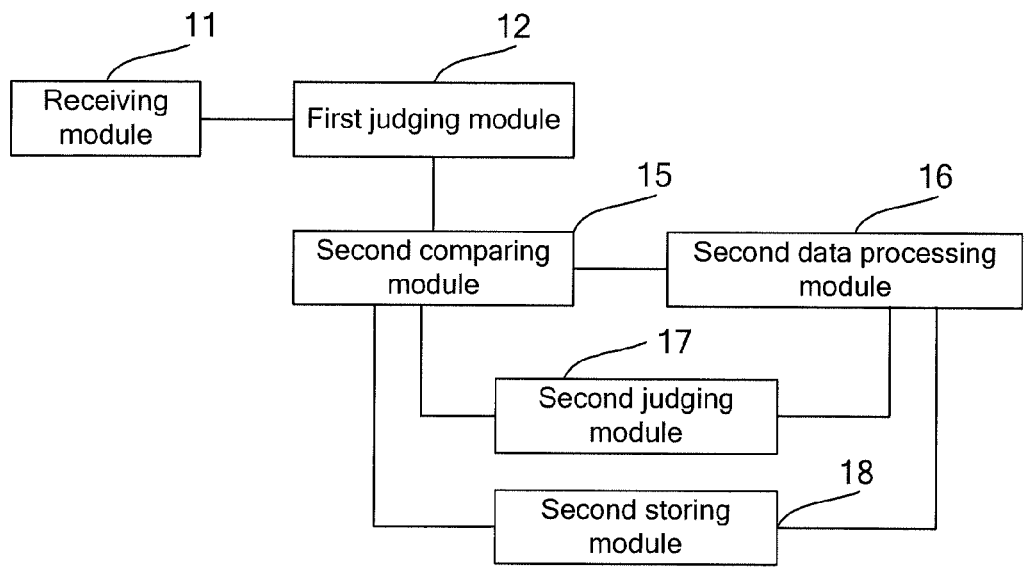
FIG. 17 is a schematic structural diagram of Embodiment 3 of a device in the broadcast network according to the present invention. 1

FIG. 17 is a schematic structural diagram of Embodiment 3 of a communication device according to the present invention. The device further includes a second judging module 17 and a second storing module 18 on the basis of the device illustrated in FIG. 16. The second judging module 17 is configured to judge whether the device is a multicast group member device according to a multicast group identifier carried in the first data packet currently received by the receiving module 11; if the device shown in FIG. 17 is a multicast group member device, the second data processing module 16 replaces a value of a non-multicast remaining hop in the currently received first data packet or first broadcast command with a value of a maximum multicast member hop interval before the second comparing module 15 compares the times that the currently received first data packet or first broadcast command is capable of being forwarded with the times that the first data packet is capable of being forwarded, where the times that the first data packet is capable of being forwarded is determined according to the pre-stored hop parameter and/or non-multicast member remaining hop parameter of the first data packet. After the value of the non-multicast remaining hop in the currently received first data packet or first broadcast command is replaced with the value of the maximum multicast member hop interval, the second comparing module 15 can perform comparison with reference to the method performed on the D device in the network architecture shown in FIG. 11 in the preceding description, which is not repeatedly described herein. If the device shown in FIG. 17 is not a multicast group member device, the second comparing module 15 may directly compare the times that the currently received first data packet or first broadcast command is capable of being forwarded with the times that the first data packet is capable of being forwarded, where the times that the first data packet is capable of being forwarded is determined according to the pre-stored hop parameter and/or non-multicast member remaining hop parameter of the first data packet; and if the times that the currently received first data packet or first broadcast command is capable of being forwarded is less than or equal to the times that the first data packet is capable of being forwarded, where the times that the first data packet is capable of being forwarded is determined according to the pre-stored hop parameter and/or non-multicast member remaining hop parameter of the first data packet, the second data processing module 16 discards the currently received first data packet.

The second storing module 18 is configured to, when the currently received first data packet is not a repeated data packet, store the identifier, the hop parameter, and the non-multicast member remaining hop parameter carried in the currently received first data packet, and store an identifier, a hop parameter, and a non-multicast member remaining hop parameter carried in a previously received first data packet.

The comparing, by the second comparing module 15, the times that the currently received first data packet or first broadcast command is capable of being forwarded with the times that the first data packet is capable of being forwarded, where the times that the first data packet is capable of being forwarded is determined according to the pre-stored hop parameter and/or non-multicast member remaining hop parameter of the first data packet, is specifically: determining the times A1 that the first data packet is capable of being forwarded, according to a hop parameter of the currently received first data packet or first broadcast command; determining the times B1 that the first data packet is capable of being forwarded, according to a non-multicast member remaining hop parameter of the first data packet or first broadcast command; determining the times A2 that the first data packet is capable of being forwarded, according to the pre-stored hop parameter of the first data packet; and determining the times B2 that the first data packet is capable of being forwarded, according to the pre-stored non-multicast member remaining hop parameter; determining that the times that the currently received first data packet or first broadcast command is capable of being forwarded is greater than the times that the first data packet is capable of being forwarded, where the times that the first data packet is capable of being forwarded is determined according to the pre-stored hop parameter and/or non-multicast member remaining hop parameter of the first data packet, if A1 is greater than A2 and B1 is greater than B2; or determining that the times that the currently received first data packet or first broadcast command is capable of being forwarded is greater than the times that the first data packet is capable of being forwarded, where the times that the first data packet is capable of being forwarded is determined according to the pre-stored hop parameter and/or non-multicast member remaining hop parameter of the first data packet, if A1 is greater than A2 or B1 is greater than B2.

When the comparison result of the second comparing module 15 is that the times that the currently received first data packet or first broadcast command is capable of being forwarded is greater than the times that the first data packet is capable of being forwarded, where the times that the first data packet is capable of being forwarded is determined according to the pre-stored hop parameter of the first data packet, the second data processing module 16 replaces the hop parameter of the first data packet pre-stored by the second storing module 18 with a hop parameter of the currently received first data packet or first broadcast command, replaces the non-multicast member remaining hop parameter of the first data packet pre-stored by the second storing module 18 with a non-multicast member remaining hop parameter of the currently received first data packet or first broadcast command, and forwards the currently received first data packet or sends the first broadcast command.

The second data processing module 16 may include a third data processing sub-unit and a fourth data processing sub-unit (not shown in FIG. 17). The third data processing sub-unit judges whether the times that the first data packet is capable of being forwarded is 0, where the times that the first data packet is capable of being forwarded is determined according to the hop parameter and/or non-multicast member remaining hop parameter pre-stored by the second storing module 18; forwards the currently received first data packet if the times that the first data packet is capable of being forwarded is 0, where the times that the first data packet is capable of being forwarded is determined according to the pre-stored hop parameter and/or non-multicast member remaining hop parameter; and sends the first broadcast command if the times that the first data packet is capable of being forwarded is not 0, where the times that the first data packet is capable of being forwarded is determined according to the pre-stored hop parameter and/or non-multicast member remaining hop parameter.

The fourth data processing sub-unit judges whether all adjacent devices have received the first data packet or first broadcast command; if all the adjacent devices have received the first data packet or first broadcast command, the second data processing module 16 sends the first broadcast command; and if not all the adjacent devices have received the first data packet or first broadcast command, the second data processing module 16 sends the currently received first data packet.

According to the method and device provided in the embodiments of the present invention, the data packet received repeatedly is not directly discarded, but it is required to further judge the times that the data packet received currently is capable of being forwarded and the times that the data packet is capable of being forwarded, where the times that the data packet is capable of being forwarded is determined according to the pre-stored hop parameter of the data packet or according to the pre-stored non-multicast member remaining hop parameter of the data packet; and if the times that the data packet received currently is capable of being forwarded is greater than the times that the data packet is capable of being forwarded, where the times that the data packet is capable of being forwarded is determined according to the pre-stored hop parameter or non-multicast member remaining hop parameter, it is required to forward the data packet or send the first broadcast command to adjacent devices, so as to improve the reliability of sending a data packet in the broadcasting manner, thereby avoiding the situation where certain devices in some broadcast networks fail to receive the data packet.

Persons of ordinary skill in the art should understand that all or a part of the steps of the method according to the embodiments of the present invention may be implemented by a program instructing relevant hardware. The program may be stored in a computer readable storage medium. When the program is executed, the steps of the method according to the embodiments of the present invention are performed. The storage medium may be any medium that is capable of storing program codes, such as a ROM, a RAM, a magnetic disk, and an optical disk.

Finally, it should be noted that the above embodiments are merely used for describing the technical solutions of the present invention, but not intended to limit the present invention. It should be understood by persons of ordinary skill in the art that although the present invention has been described in detail with reference to the foregoing exemplary embodiments, modifications or equivalent replacements may still be made to the technical solutions of the present invention, and such modifications or replacements should not cause the amended technical solutions to depart from the spirit and scope of technical solutions of the present invention.

What is claimed is:

1. A broadcasting method, comprising:
   receiving a first data packet, a hop parameter is carried by the first data packet;
   in response to a determination that the first data packet is a new data packet, storing the hop parameter carried by the first data packet, as a pre-stored hop parameter, wherein the hop parameter carried by the first data packet is used to indicate a number of times that the first data packet is capable of being forwarded;
   receiving a second data packet;
   in response to a determination, according to the first data packet, that the second data packet is a repeatedly received data packet, comparing a hop parameter carried by the second data packet with the pre-stored hop parameter, wherein the hop parameter carried by the second data packet is used to indicate a number of times that the second data packet is capable of being forwarded; and
   discarding the second data packet in response to a determination based upon the comparing that the hop parameter carried by the second data packet is less than or equal to the pre-stored hop parameter.

2. The broadcasting method according to claim 1, comprising:
   judging whether the second data packet is repeatedly received according to an identifier carried by the second data packet, wherein the identifier includes a source address and a sequence number of the second data packet, or the identifier includes a time stamp of the data packet, or the identifier includes the time stamp and the source address of the data packet.

3. The broadcasting method according to claim 1, comprising:
   in response to a determination that the hop parameter carried by the second data packet is greater than the pre-stored hop parameter of the first data packet, replacing the pre-stored hop parameter with the hop parameter of the second data packet, and forwarding the second data packet or sending a broadcast command.

4. The broadcasting method according to claim 3, wherein the forwarding the second data packet comprises:
   judging whether the pre-stored hop parameter is 1;
   forwarding the second data packet in response to a determination that the pre-stored hop parameter is 1; and
   sending the broadcast command in response to a determination that the pre-stored hop parameter is not 1.

5. The broadcasting method according to claim 4, wherein the broadcast command comprises an identifier, a byte length of the second data packet and a value that is obtained after hop processing is performed on a hop parameter of the data packet.

6. The broadcasting method according to claim 3, wherein the forwarding the second data packet comprises:
   judging whether all adjacent devices receive the second data packet;
   sending the broadcast command if all the adjacent devices receive the second data packet; and
   forwarding the second data packet if not all the adjacent devices receive the second data packet.

7. The broadcasting method according to claim 6, wherein the judging whether all adjacent devices receive the second data packet comprises:
   judging whether the second data packet sent by all the adjacent devices has been received.

8. The broadcasting method according to claim 3, after replacing the pre-stored hop parameter, the method further comprising:
   receiving a third data packet;
   in response to a determination, according to the second data packet, that the third data packet is a repeatedly received data packet, comparing a hop parameter carried by the third data packet with the pre-stored hop parameter; and discarding the third data packet in response to a determination based upon the comparing that the hop parameter carried by the third data packet is less than or equal to the pre-stored hop parameter.

9. A communication device, comprising:
a processor; and
a non-transitory computer readable storage medium storing programming instructions for execution by the processor, the programming instructions including instructions to:
- receive a first data packet, a hop parameter is carried by the first data packet;
- in response to a determination that the first data packet is a new data packet, store the hop parameter carried by the first data packet, as a pre-stored hop parameter, wherein the hop parameter carried by the first data packet is used to indicate a number of times that the first data packet is capable of being forwarded;
- receive a second data packet;
- in response to a determination, according to the first data packet, that the second data packet is a repeatedly received data packet, perform a comparison of a hop parameter carried by the second data packet with the pre-stored hop parameter, wherein the hop parameter carried by the second data packet is used to indicate a number of times that the second data packet is capable of being forwarded; and
- discard the second data packet in response to a determination based upon the comparison that the hop parameter carried by the second data packet is less than or equal to the pre-stored hop parameter.

10. The communication device according to claim 9, wherein the programming instructions comprises instructions to judge whether the second data packet is repeatedly received according to an identifier carried by the second data packet, wherein the identifier includes a source address and a sequence number of the data packet, or the identifier includes a time stamp of the second data packet, or the identifier includes the time stamp and the source address of the data packet.

11. The communication device according to claim 9, wherein the programming instructions further comprises instructions to replace the pre-stored hop parameter with the hop parameter of the second data packet, and forward the data packet or sending a broadcast command in response to a determination that the hop parameter carried by the second data packet is greater than the pre-stored hop parameter of the second data packet.

12. The communication device according to claim 11, wherein the programming instructions further comprises:
- instruction to receive a third data packet after replacing the pre-stored hop parameter;
- instruction to perform a comparison of a hop parameter carried by the third data packet with the pre-stored hop parameter, upon determining, according to the second data packet, that the third data packet is a repeatedly received data packet; and
- instruction to discard the third data packet in response to a determination based upon the comparison that the hop parameter carried by the third data packet is less than or equal to the pre-stored hop parameter.

* * * * *